(12) United States Patent
Fancher et al.

(10) Patent No.: US 7,894,719 B2
(45) Date of Patent: *Feb. 22, 2011

(54) RECORDING DATA ON MOTION PICTURE FILM

(75) Inventors: James Arthur Fancher, Marina del Rey, CA (US); Jeff James Rosica, Beverly Hills, CA (US)

(73) Assignee: Thomson Licensing, Boulogne, Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/322,984

(22) Filed: Feb. 10, 2009

(65) Prior Publication Data

US 2009/0190455 A1    Jul. 30, 2009

Related U.S. Application Data

(62) Division of application No. 10/559,110, filed on Dec. 2, 2005, now Pat. No. 7,508,484.

(51) Int. Cl.
*G03B 17/24* (2006.01)
*G03B 19/18* (2006.01)

(52) U.S. Cl. .................. 396/317; 396/316; 352/44
(58) Field of Classification Search .............. 352/44
See application file for complete search history.

(56) References Cited

U.S. PATENT DOCUMENTS

| | | | |
|---|---|---|---|
| 2,905,554 A * | 9/1959 | Fuchsman et al. | 430/270.1 |
| 4,306,781 A | 12/1981 | Mosely | 352/37 |
| 4,443,694 A | 4/1984 | Sanford | 235/462.04 |
| 4,461,552 A | 7/1984 | Levine | 352/27 |
| 4,553,833 A | 11/1985 | Kanaoka et al. | 355/40 |
| 4,600,280 A | 7/1986 | Clark | 352/37 |
| 4,659,198 A | 4/1987 | Beauviala et al. | 352/92 |
| 4,893,921 A | 1/1990 | Beauviala | 352/92 |
| 5,187,594 A | 2/1993 | Deutsch et al. | 358/3.13 |
| 5,347,509 A | 9/1994 | Goldberg et al. | 369/59.21 |
| 5,453,802 A | 9/1995 | Kohut et al. | 352/27 |
| 5,544,140 A | 8/1996 | Seagrave et al. | 369/59 |
| 5,757,465 A | 5/1998 | Seagrave et al. | 352/11 |
| 6,400,399 B1 | 6/2002 | Anderson et al. | 348/96 |
| 6,839,900 B2 | 1/2005 | Obata et al. | 720/729 |
| 7,030,902 B2 | 4/2006 | Jacobs | 348/42 |
| 7,508,484 B2 * | 3/2009 | Fancher et al. | 352/44 |

(Continued)

FOREIGN PATENT DOCUMENTS

DE    19847565    4/2000

(Continued)

OTHER PUBLICATIONS

"Some Experiments in Digital Holographic Recording" Proceedings of the Conference Video and Data Recording, IERE Conference Proceedings No. 43, pp. 329-337, Jul. 1979.

*Primary Examiner*—Clayton E Laballe
*Assistant Examiner*—Bret Adams
(74) *Attorney, Agent, or Firm*—Robert D. Shedd; Joseph J. Opalach

(57) ABSTRACT

A film record comprises a film strip representing a plurality of frames. At least one of the frames includes at least one region wherein the optical density of the region is representative of a symbol from a constellation of symbols.

14 Claims, 23 Drawing Sheets

U.S. PATENT DOCUMENTS

2008/0089603 A1  4/2008  Lewis et al. ............. 382/274

FOREIGN PATENT DOCUMENTS

| | | |
|---|---|---|
| EP | 1186943 | 3/2002 |
| JP | 5-189926 | 7/1993 |
| JP | 6-89433 | 3/1994 |
| JP | 6-111331 | 4/1994 |
| JP | 11025457 | 1/1999 |
| JP | 2000-293969 | 10/2000 |
| JP | 2009-244523 | * 10/2009 |
| WO | WO 96/30217 | 10/1996 |
| WO | WO 00/28726 | 5/2000 |

* cited by examiner

RECORDING DATA ON MOTION PICTURE FILM

CROSS-REFERENCE TO RELATED APPLICATIONS

This application claims benefit under 35 U.S.C. §120 and is a division of U.S. patent application Ser. No. 10/559,110 filed Dec. 2, 2005 now U.S. Pat. No. 7,508,484, which is a 35 U.S.C. §371 national stage application of PCT/US04/019005 filed Jun. 16, 2004, and published in accordance with PCT Article 21 (2) on Dec. 29, 2004 in English and which claims the benefit of U.S. provisional patent application No. 60/479,433, filed Jun. 18, 2003.

BACKGROUND OF THE INVENTION

The present invention generally relates to apparatus and methods for recording data on film.

Many applications require the storage of very large quantities of data for long periods of time. One example is found in the production of motion pictures or movies. Traditionally, a movie was made by shooting an original camera negative (OCN), which was then edited by cutting and splicing operations. More recently, the use of digital special effects has introduced a requirement for some parts of the OCN to be "scanned" to convert each frame of film into a set of digital data, which represents the frame film image information. Similarly, when an old movie is to be restored using digital techniques it may be necessary to scan all of the film so as to obtain a digitized version of the entire movie (a digital film record).

The process of scanning a film to create a digital film record is expensive and time consuming, and each use of the OCN increases the possibility of damage. Hence, it would be advantageous to treat the digital film record itself as the archive of the content, rather than the traditional approach of creating three monochrome separations on film and archiving those.

In this regard, the scanning process generates very large quantities of data. Today, most film scanning is performed at a resolution of "2K", meaning 2048 pixels horizontally by 1536 pixels vertically (or similar resolutions generating similar quantities of data). Generally each pixel is represented by a digital value for each of red, green, and blue representative signals, where each digital value has a precision of at least ten bits. This means that more than 11 MB (millions of bytes) of data is generated for each frame of a film. There are normally 24 frames in a second of film, yielding an effective data rate of approximately 300 MBps (megabytes per second). Thus, a 2-hour movie would be represented by more than 2 terabytes (TB) of data, where, for purposes of this description, each terabyte is defined herein as being equal to 1,000,000 MB.

However, data storage requirements will continue to increase. For example, scanning a film with a "4 k" resolution, and 14-bit precision, generates about 66 MB for each frame of film. In addition, if digital techniques are used for all of the production it may be necessary to scan an OCN that exceeds by many times the duration of the final movie. These additional factors mean that the data storage requirements for a single movie may reach many tens of terabytes.

Such quantities of data are very difficult to handle and store. Current data tape mechanisms can transfer data to tape at a rate of approximately 50 MBps, and provide storage of approximately one half of a terabyte on a single tape. Using such a device, transferring a 2-hour movie at a 2K resolution to tape would require four tapes and take nearly twelve hours to complete.

Another problem with storage of data is longevity. Most magnetic media such as tape, and optical storage media such as CDs and DVDs, have expected lives of a few tens of years. These life spans are quite unacceptable for archival purposes. In comparison, the science of archiving film is well developed, and color film can be maintained in good condition for many tens of years, while monochrome separations on modern stock are expected to have a useful life of hundreds of years.

Film records are, in fact, quite different from most forms of records. For example, in magnetic recording or optical recording it may be possible to overwrite or destroy the record. In particular, in magnetic recording, elements are magnetized in a certain direction during the recording process. Clearly the same elements can be de-magnetized or re-magnetized by a re-application of the recording process. Similarly, while optical records generally take the form of physical indentations in a surface, or alterations in a dye layer which result in a localized change in the optical properties of the layer, that are not easily altered, it may be possible to overwrite, or at least to destroy, the optical record by a reapplication of the recording process.

In contrast, in a film record the application of light to photographic film (exposure) causes a latent image that is then subjected to a chemical "development" process so that the image is substantially reinforced. Unexposed emulsion is then removed by a process known as "fixing". The combination of these processes yields a very robust record that can no longer be overwritten by re-exposure, or damaged by anything but extreme physical processes.

Although the movie industry has been used as an example, many other businesses create large amounts of data and have needs for archival storage of this data. It is interesting to note that the longevity of film records compared to other available storage mechanisms has been recognized in the data industry. Some companies such as Anacomp, Inc. offer services to businesses requiring long-term storage of computer data records. In one mechanism, data records are imaged as character displays on (for example) a cathode ray tube and recorded on film, usually 16 mm (milli-meter) or 105 mm microfiche. An example of this technology is described in U.S. Pat. No. 4,553,833, issued Nov. 19, 1985. In this patent, light emitted from a relatively large-sized array (such as a light emitting diode array) is focused through converging lenses to cause a relatively small-sized dot pattern to be projected on a film. While this approach yields records that can provide the desired degree of permanence, the data density is relatively low (perhaps 100 to 1000 bytes/mm$^2$) and hence the technique is not suited to storage of very large data records.

It should be noted that binary data may also be recorded directly onto film as a pattern of black and white dots representing values of ones and zeroes. Generally some sophisticated coding scheme is used to improve the effective data density and to provide error correction capability to ensure robustness. These techniques have been used extensively for recording audio data onto the edge of a motion picture film. For example, U.S. Pat. No. 4,600,280, issued Jul. 15, 1986, describes a technique for recording a digital soundtrack on a film strip by exposing the film to modulated light from a light source. In one method disclosed therein an intermittent light beam (encoded with digital audio information) is scanned horizontally across the film, and the film is then advanced vertically and the scanning process repeated. This patent also describes that the light can be projected on the film through a linear array of solid state shutters or Bragg cell modulators.

Other examples of storing data on film are described in the following U.S. patents. U.S. Pat. No. 4,461,552, issued Jul. 24, 1984, describes a method for photographically recording digital audio on motion picture film. U.S. Pat. No. 4,306,781, issued Dec. 22, 1981, describes recording a command data track on motion picture film, along with an unmodulated locator and several analog soundtracks. Similarly, both U.S. Pat. No. 4,659,198, issued Apr. 21, 1987, and U.S. Pat. No. 4,893,921, issued Jan. 16, 1990, describe a process for recording digital data along an edge portion of a strip of cinematographic film. And, U.S. Pat. No. 5,453,802, issued Sep. 26, 1995, discloses a method and apparatus for photographically recording digital audio signals, and a medium having digital audio signals photographically recorded thereon.

In general, the technology represented by the above-described patents provide a very robust signal that can survive the two printing processes generally necessary to generate a movie release print, and that is reasonably tolerant of minor damage that can occur with use, particularly to edges of a release print. Unfortunately, the recording density is below one kilobyte/mm$^2$, which is too low for use in providing long-term archival storage of large amounts of data such as represented by, e.g., a digital film record.

SUMMARY OF THE INVENTION

In accordance with the principles of the invention, a medium having data stored thereon comprises a film, wherein portions of the film represent different optical density values; and wherein each level of optical density is associated with a symbol from a constellation of symbols. As a result, the inventive concept provides for a method and apparatus for recording data that not only takes advantage of the exceptional longevity of a film record—but also provides recording density values significantly higher than one kilobyte/mm$^2$.

In an embodiment in accordance with the principles of the invention, a film record comprises a film strip representing a plurality of frames. At least one of the frames includes at least one region wherein the optical density of the region is representative of a symbol from a constellation of symbols.

In another embodiment in accordance with the principles of the invention, a recording system comprises an encoder and a mapper. The encoder receives data to-be-recorded and provides encoded data to the mapper. The latter selects optical symbols, from a constellation of optical symbols, as a function of the encoded data. The film is then exposed to represent thereon the selected optical symbols to provide a "density film record."

In another embodiment in accordance with the principles of the invention, a system comprises a reader, which includes a decoder. The reader processes a density film record to recover therefrom encoded data, which is provided to the decoder for recovery of the data.

In another embodiment in accordance with the principles of the invention, a data cartridge transports a film strip, wherein portions of the film strip represent different density values; and wherein each level of density is associated with a symbol selected from a constellation of symbols. The data cartridge further comprises an identifier that represents content-related information (meta-data) pertaining to the data stored on the film strip. Although not limited to the following examples, this meta-data may comprise one, or more, of the following items: title, dates, source history, processing history prior to recording, etc. In accordance with a feature of the invention, the identifier represents one or more of the following: a label of readable text, a bar code, a magnetic strip, radio frequency identification (RFID) tag and/or a solid state memory chip (e.g., that is capable of being programmed with identifying information).

In one illustrative variation of the above-described embodiments, the data stored on the film record represents a digital film record.

DETAILED DESCRIPTION

As described further below, the inventive concept provides the ability to store large amounts of data for long periods of time using a proven archival medium—film. One application of the inventive concept is in the entertainment industry. In particular, the inventive concept provides a safe, reliable and cost effective archival solution for storing digital rich media content such as a digital film record.

Other than the inventive concept, the elements shown in the figures are well known and will not be described in detail. For example, other than the inventive concept, film processing, modulation transfer function, error detection and correction, encoding and decoding, modulation and demodulation, symbol mapping, etc., are well known and not described in detail herein. In addition, the inventive concept may be implemented using conventional programming techniques, which, as such, will not be described herein. Also, as used herein, the term "monochrome film" refers to a film having only a single emulsion layer and not capable of recording information that distinguishes between colors, i.e., monochrome film is "black and white" film. Such films include types known as orthochromatic and panchromatic. The term "monochrome" does not imply any particular spectral sensitivity. In addition, as used herein, the term "optical density" (OD) is defined as known in the art. For example, for a given wavelength, optical density is an expression of the transmittance of an optical element. Optical density can be mathematically expressed as $\log_{10}(1/T)$, where T is transmittance, i.e., the higher the optical density, the lower the transmittance. Finally, like numbers on the figures represent similar elements.

As described earlier, previous techniques of recording data on film operate in a binary manner—any particular area of film is either exposed (black and opaque in the negative film image) or not exposed (clear and transparent in the negative film image). While transition zones (areas of partial transparency) between exposed and nonexposed areas may exist in these previous techniques, these transition zones are not used for storing data.

In contrast, the inventive concept takes advantage of the fact that film is capable of reproducing a wide range of gray levels (differing degrees of transparency) with good accuracy to increase the quantity of data that may be stored on a given area of film. In particular, the inventive concept applies the idea of "symbols" from digital transmission systems to storing data on film.

Figure 1:
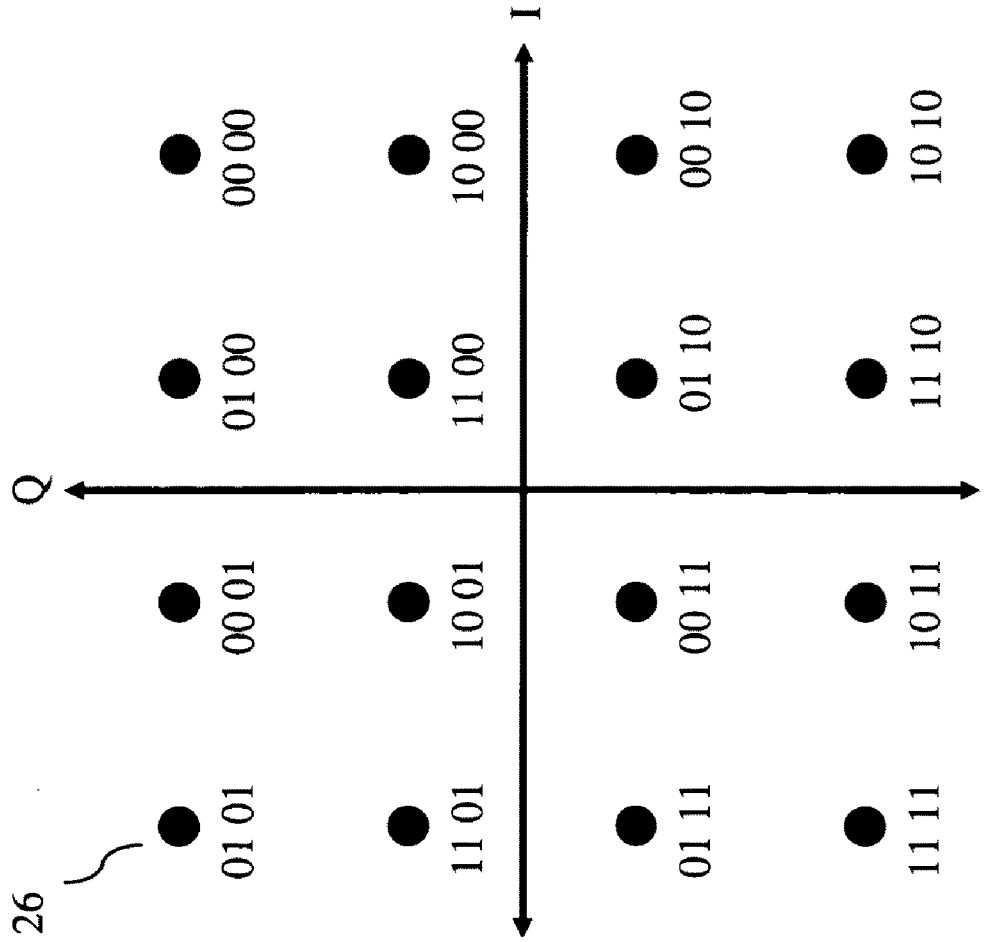
FIG. 1 shows a prior art 16QAM symbol constellation.

Digital transmission systems, used in modems and other communication systems, code multiple bits by using differing levels of a carrier, or of multiple carriers. The various levels, or combinations of levels, form a "constellation" of permissible values or symbols. Most frequently, a symbol constellation is used that has a number of symbols that is a power of two, and each symbol represents a number of bits that corresponds to the particular power of two. For example, if there are only two symbols in a constellation, i.e., ($2^1$) symbols, only one bit of information is represented (one symbol represents a value of "0" and the other symbol represents a value of "1"). Likewise, for a constellation comprising four symbols, i.e., ($2^2$) symbols, as used in the well-known transmission coding systems 4VSB (4-level Vestigial Sideband), QPSK (quadrature phase-shift keying) and 4QAM (4-level quadrature amplitude modulation), each symbol represents two bits of information, where the two bits have the possible values: 00, 01, 10 and 11. Similarly, other well-known coding schemes permit even more bits to be encoded, such as 8VSB (each symbol represents 3 bits), 32QAM (each symbol represents 5 bits), and 256QAM (each symbol represents 8 bits), etc. As further illustration, a prior art 16QAM symbol constellation 25 is shown in FIG. 1. Symbol constellation 25 comprises 16 symbols ($2^4$), each symbol representing a particular four bit value. For example, symbol 26 represents the four bit value "0101."

Figure 2:
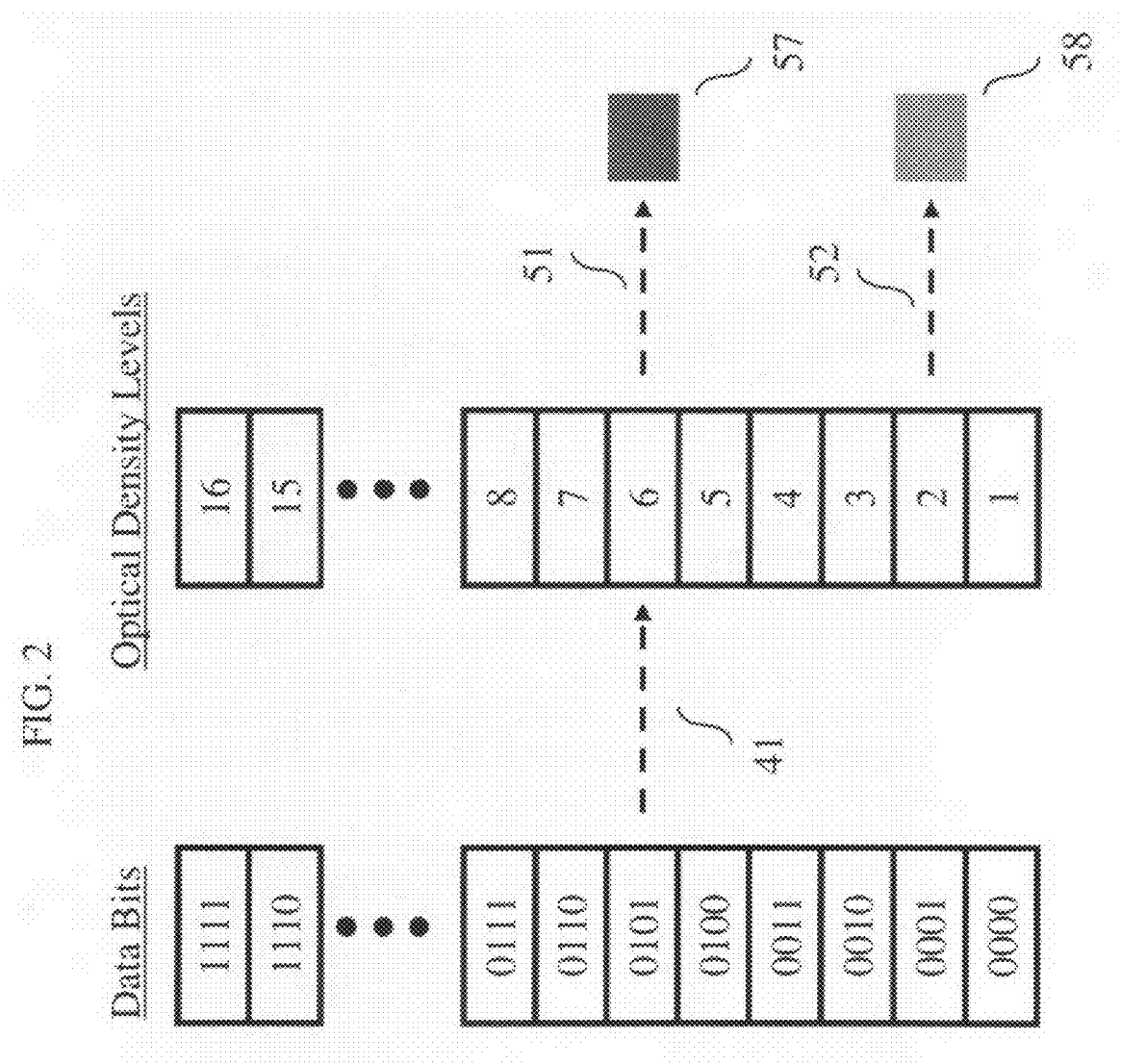
FIG. 2 illustrates the inventive concept.

Therefore, and in accordance with the principles of the invention, a range of optical density levels (differing degrees of transparency) that can be reproduced in a film are representative of various symbols of a constellation, where each symbol represents a plurality of bits. This is illustrated in FIG. 2. The latter shows a simple application of the inventive concept in the context of mapping four bits of data to one of sixteen optical density levels, or optical symbols. As shown in FIG. 2, each four bit data value is mapped to a particular optical density level. For example, the four bit value "0101" is mapped to OD level 6 as illustrated by dashed arrow 41. Illustratively, each OD level is associated with one of 16 gray levels. For example, OD level 6 is associated with gray level 57 as illustrated by dashed arrow 51 and OD level 2 is associated with gray level 58 as illustrated by dashed arrow 52. As used herein, the term "optical symbol" refers to a particular optical density level, e.g., a particular gray level as shown in FIG. 2.

Figure 3:
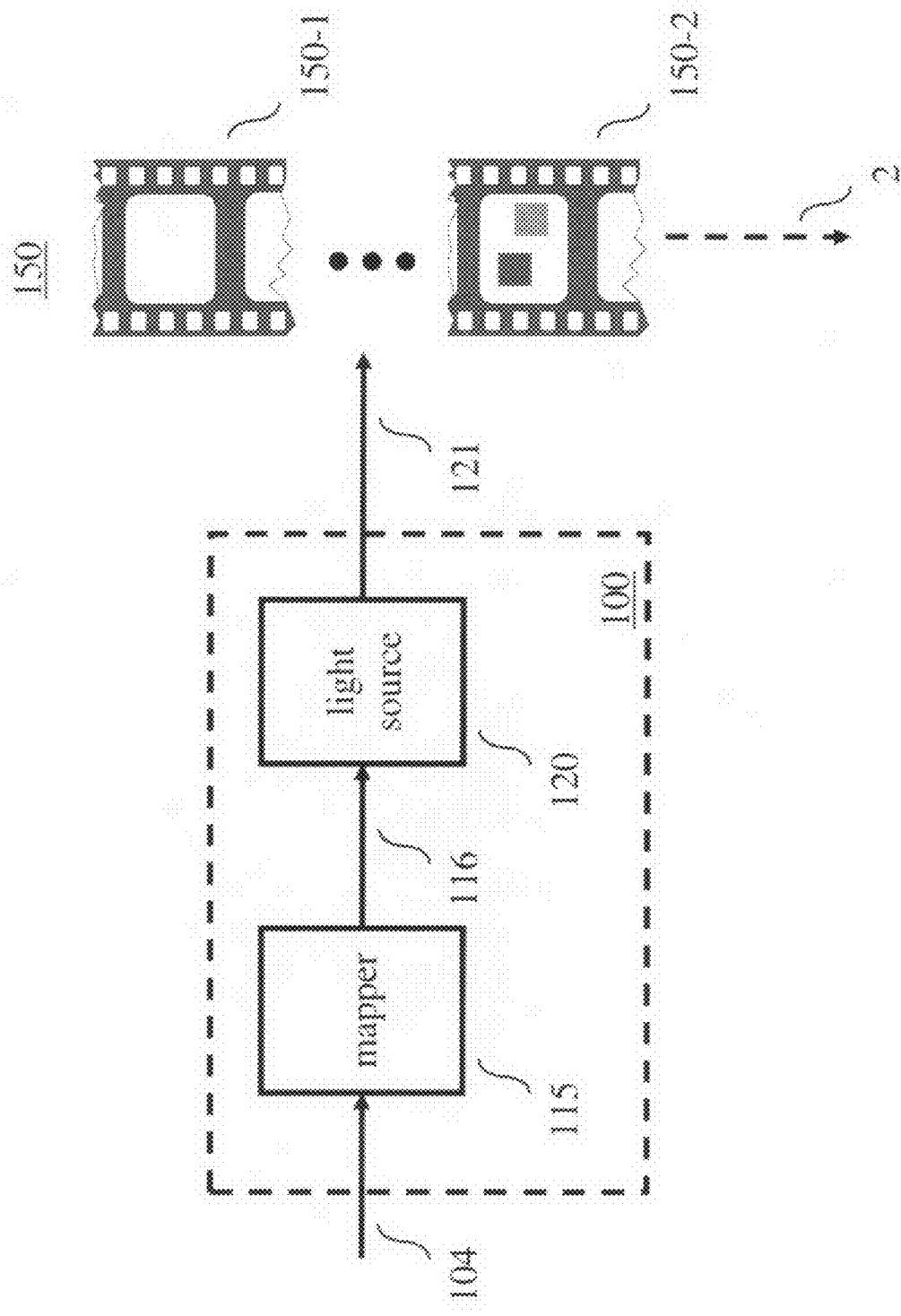
FIG. 3 shows an illustrative embodiment in accordance with the principles of the invention.
Figure 4:
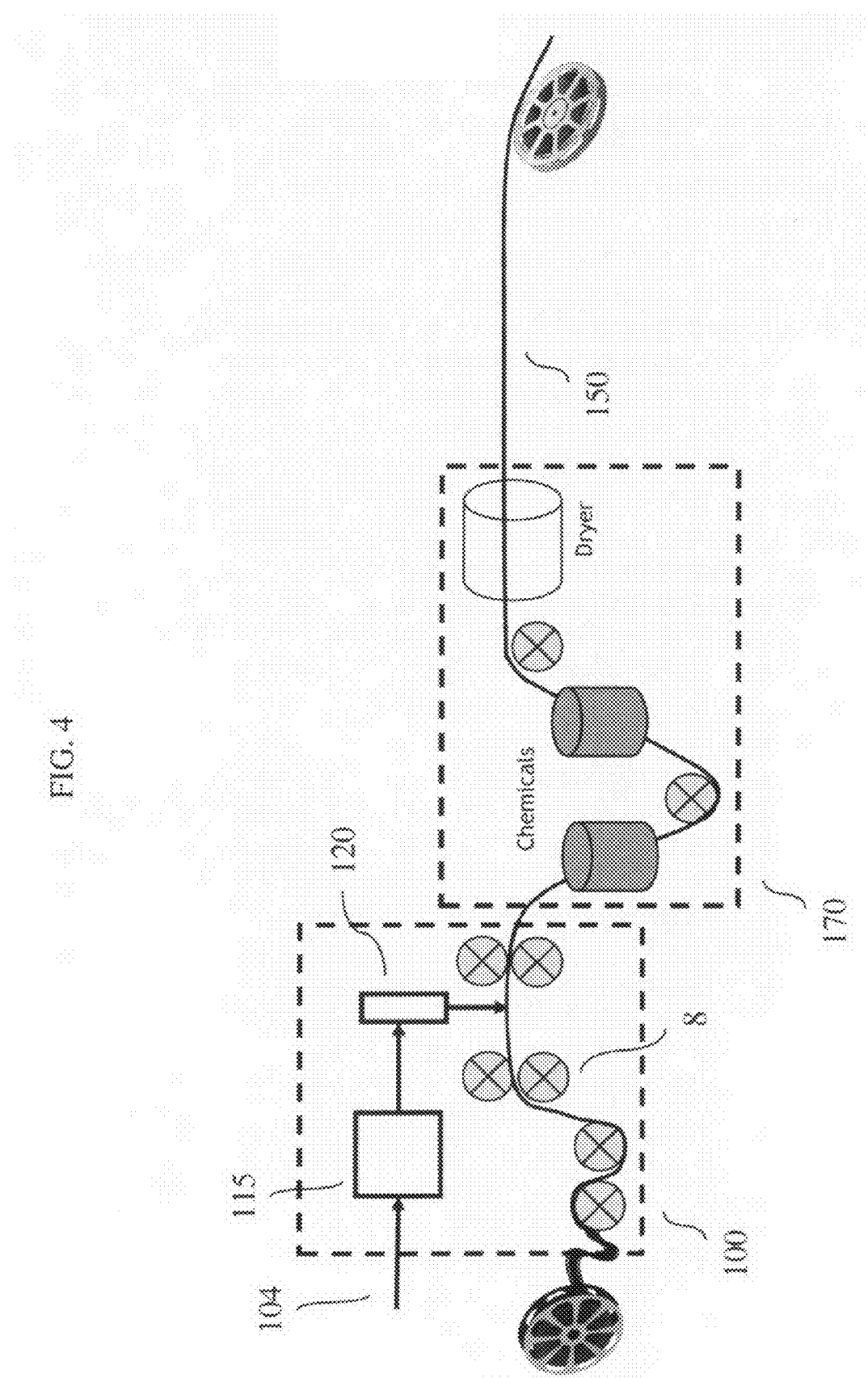
FIG. 4 shows another illustrative embodiment in accordance with the principles of the invention.

Turning now to FIG. 3, a further illustration of the inventive concept is shown for storing data on film. An input data signal 104, which conveys data, is applied to recording system (recorder) 100 for storage of the data on film 150. The latter is illustratively monochrome film. Although not required for the inventive concept, with respect to an archiving application monochrome film has the greatest stability and longevity. Recorder 100 includes a mapper 115 and light source 120. The input data signal 104 is applied to mapper 115. Input data signal 104 is representative of one, or more, input data signals (e.g., data presented in serial or parallel form). For example, in the context of FIG. 2, input data signal 104 conveys four bits of data every symbol interval, T. Alternatively, input data signal 104 may represent one, or more, bits of data that are accumulated over time by mapper 115 to form the four data bits every T symbol interval. Mapper 115 maps the input data signal to one of a number of optical symbols every symbol interval T. Each resulting symbol is provided via signal 116 to light source 120. Again, in the context of FIG. 2, there are sixteen optical symbols, each optical symbol associated with a corresponding gray level. Illustratively, light source 120 exposes areas of film 150 (as used herein, areas of film are also referred to as picture elements or pixels) to varying degrees, via exposure signal 121, to record one of a plurality of optical symbols (levels of partial transparency) at each pixel location, so that a plurality of bits of information may be represented by the optical symbol or transparency of each pixel. Film 150 advances a frame at a time in the direction illustrated by dashed arrow 2. A blank frame is illustrated by frame 150-1 of film 150, a recorded frame is illustrated by frame 150-2 of film 150. Light source 120 is representative of any known mechanisms that can record an image to film. For example, light source 120 is a laser recorder that is designed to write high quality conventional analog images to film. This is a known color device with three lasers intended to expose the three layers of a color film, but in the context of FIG. 3 a single laser need only be used with monochrome film 150. Other devices, including, but not limited to, LCDs (liquid crystal displays) and cathode ray displays, may also be used to record film images. Each would have different characteristics that affect the achievable density, i.e., the number of symbols that may be recorded along the length and width of the film. Important parameters that differ among such devices are addressability, speed, resolution, optical blooming, etc. Following the recording operation the exposed film is processed (developed and fixed) so as to reveal the latent image, and to make the record permanent. This is illustrated in FIG. 4, where film 150 is further processed by element 170, which includes chemical processing and drying as known in the art for making the record permanent. Element 8 shown in FIG. 4 is representative of one of a number of capstan drives that utilize mechanized spindles to move film 150 through the apparatus. It should be noted that the details of processing can also be variable, and can result in different contrast laws and other characteristics of the imaging system.

Although illustrated in the context of 16 optical symbols, it should be noted that a relatively large area of film can accurately convey a large number of optical symbols. For example, 1024 varying degrees of gray levels can be used, i.e., a symbol constellation of $2^{10}$ optical symbols, each optical symbol representing 10 bits of data. On the other hand, a very small area of film can accurately distinguish a lesser number of levels. In part this is due to limitations that must exist in the positional accuracy of the recording and reading processes. Also, a very small area will be subject to a degree of uncertainty because of the random nature of film grain, and of the manner in which film grain is "clumped". These effects are the equivalent of noise on the recovered signal, and reduce the ability to distinguish between recorded gray levels.

Figure 5:
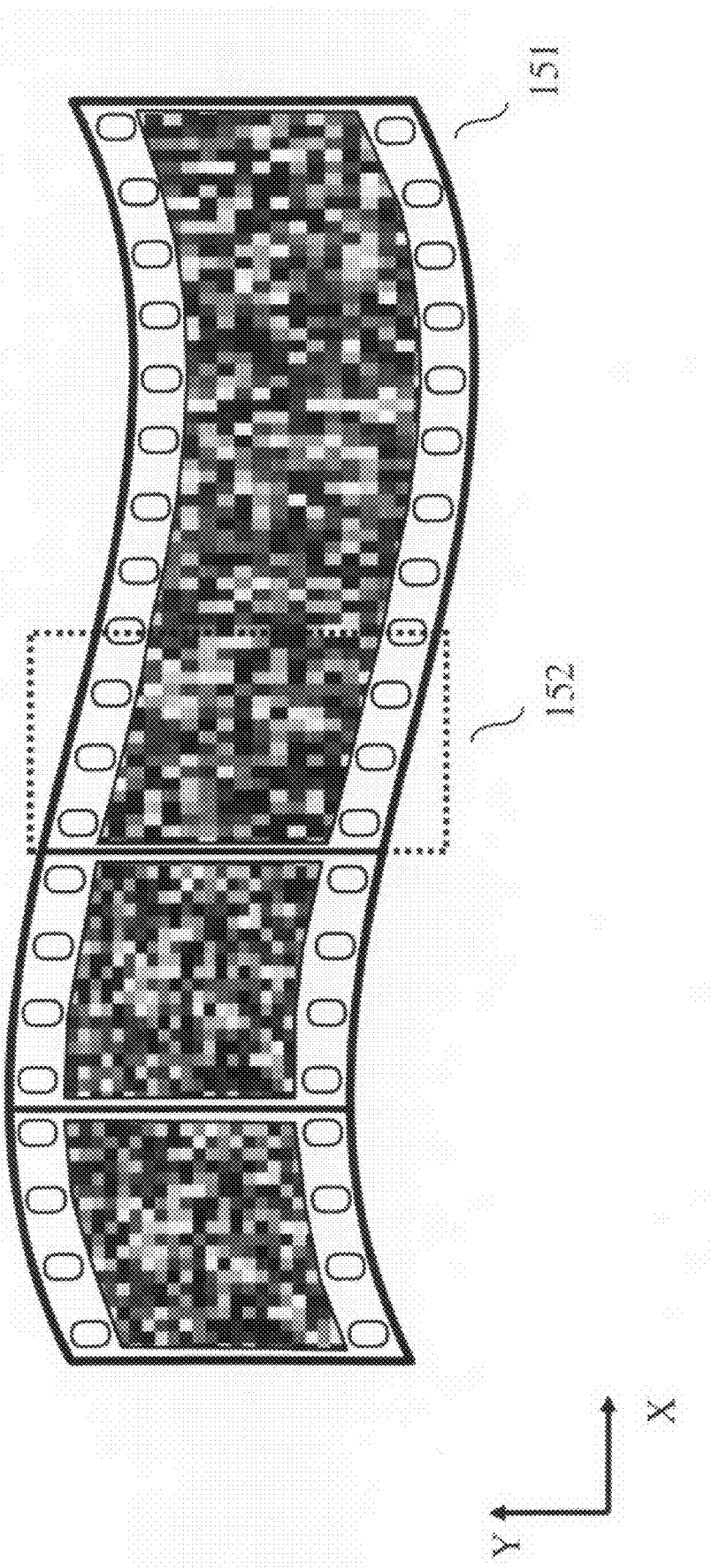
FIGS. 5-11 illustrate recording data on film in accordance with the principles of the invention.

In accordance with the principles of the invention, an illustrative portion 151 of a film is shown in FIG. 5 after exposure. As can be observed from FIG. 5, portion 151 comprises a number of optical symbols recorded along both the X (length) and Y (width) dimensions of the film. Illustratively, the optical symbols are represented by various gray levels, each optical symbol representing a plurality of data bits. A further film portion 152 is identified in FIG. 5 and is shown in more detail in FIG. 6. As can be observed from FIG. 6, film portion 152 is representative of recording data using a symbol constellation of $2^8$ optical symbols, e.g., 256 gray levels ranging from gray level #1 to gray level #256. In particular, arrow 67 illustrates the use of gray level #38, which is predefined as representing the eight bit value "00100110." A further film portion 153 is identified in FIG. 6 and is shown in more detail in FIG. 7 to further illustrate the inventive concept.

Figure 6:
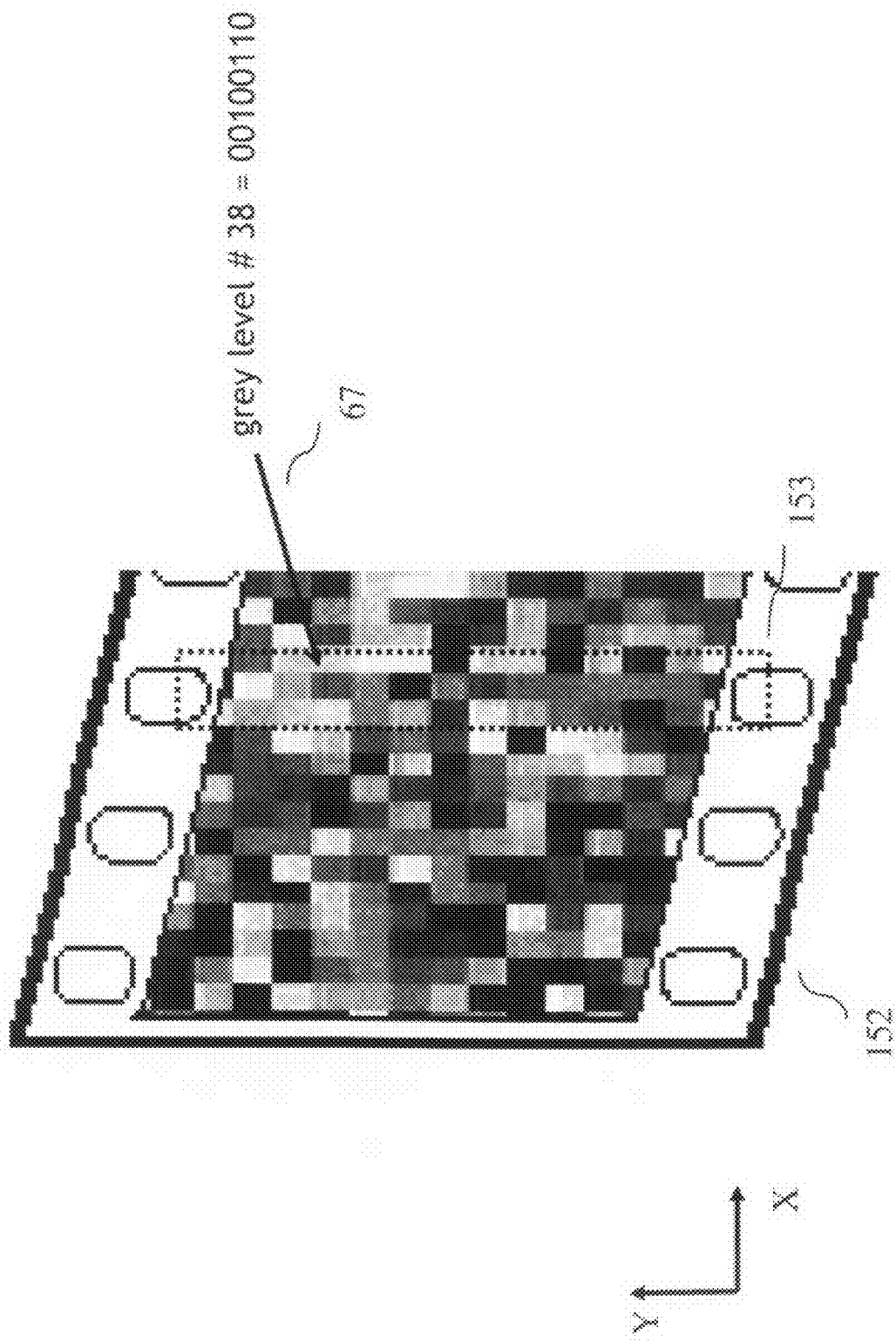
Figure 7:
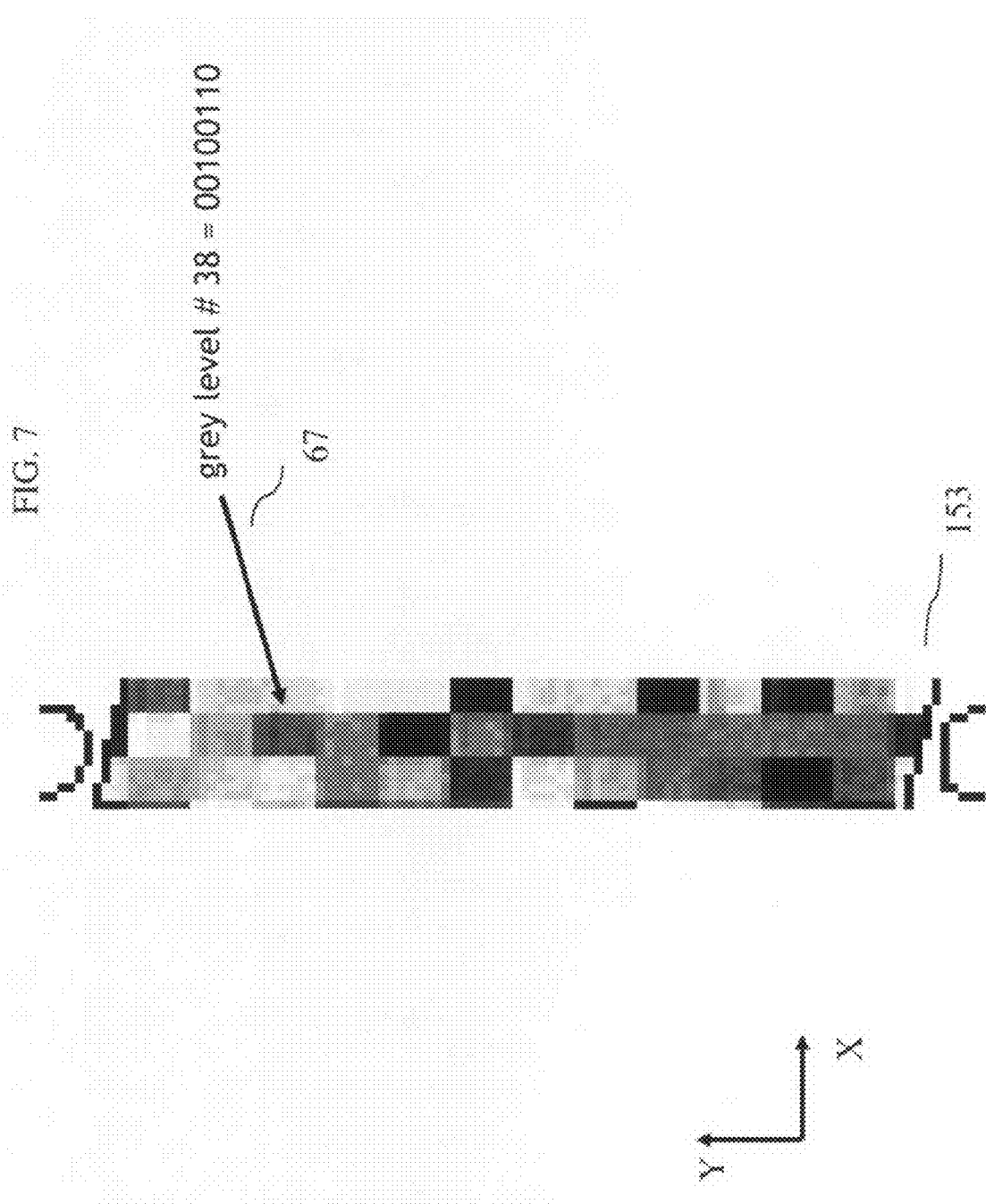
Figure 8:
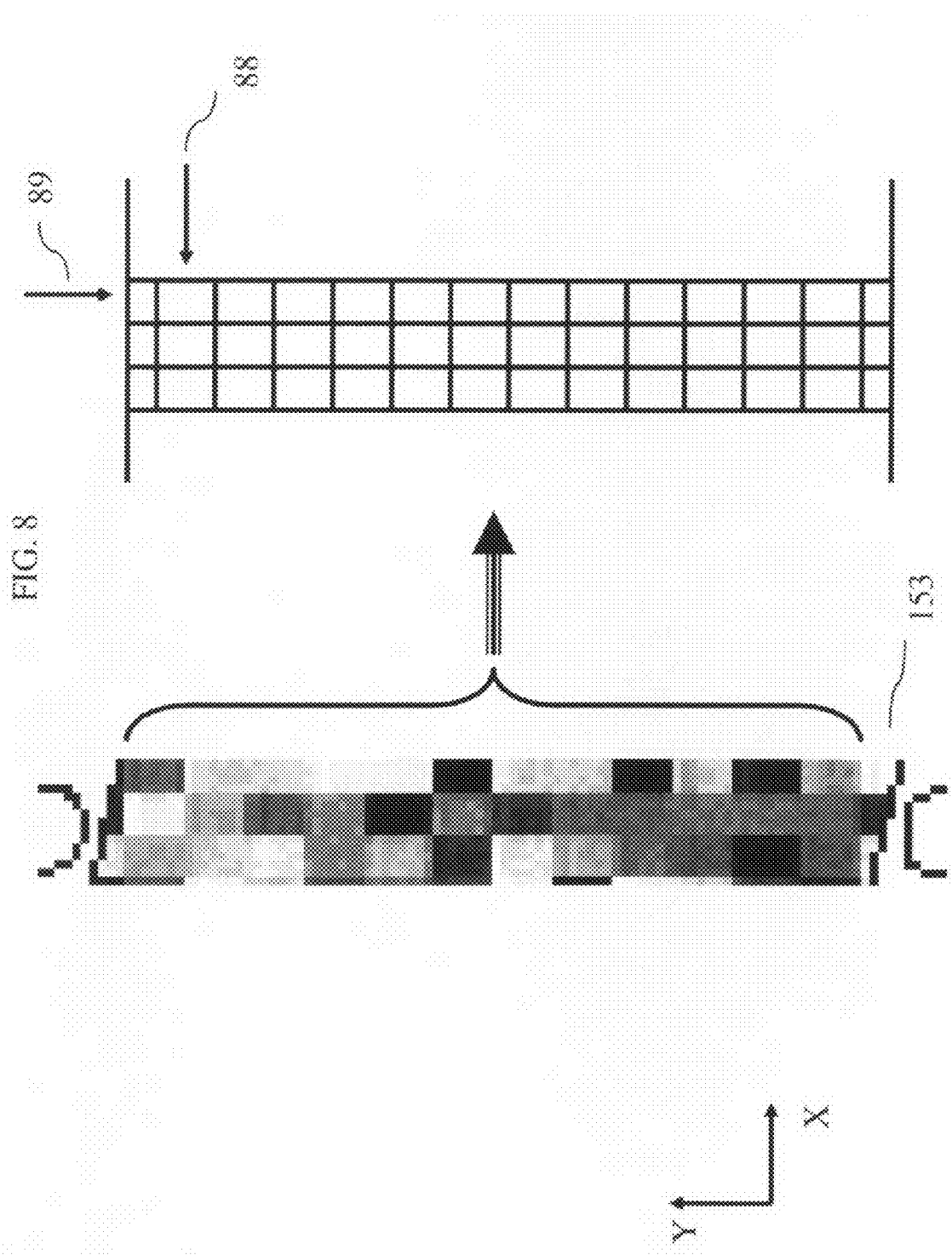
Figure 9:
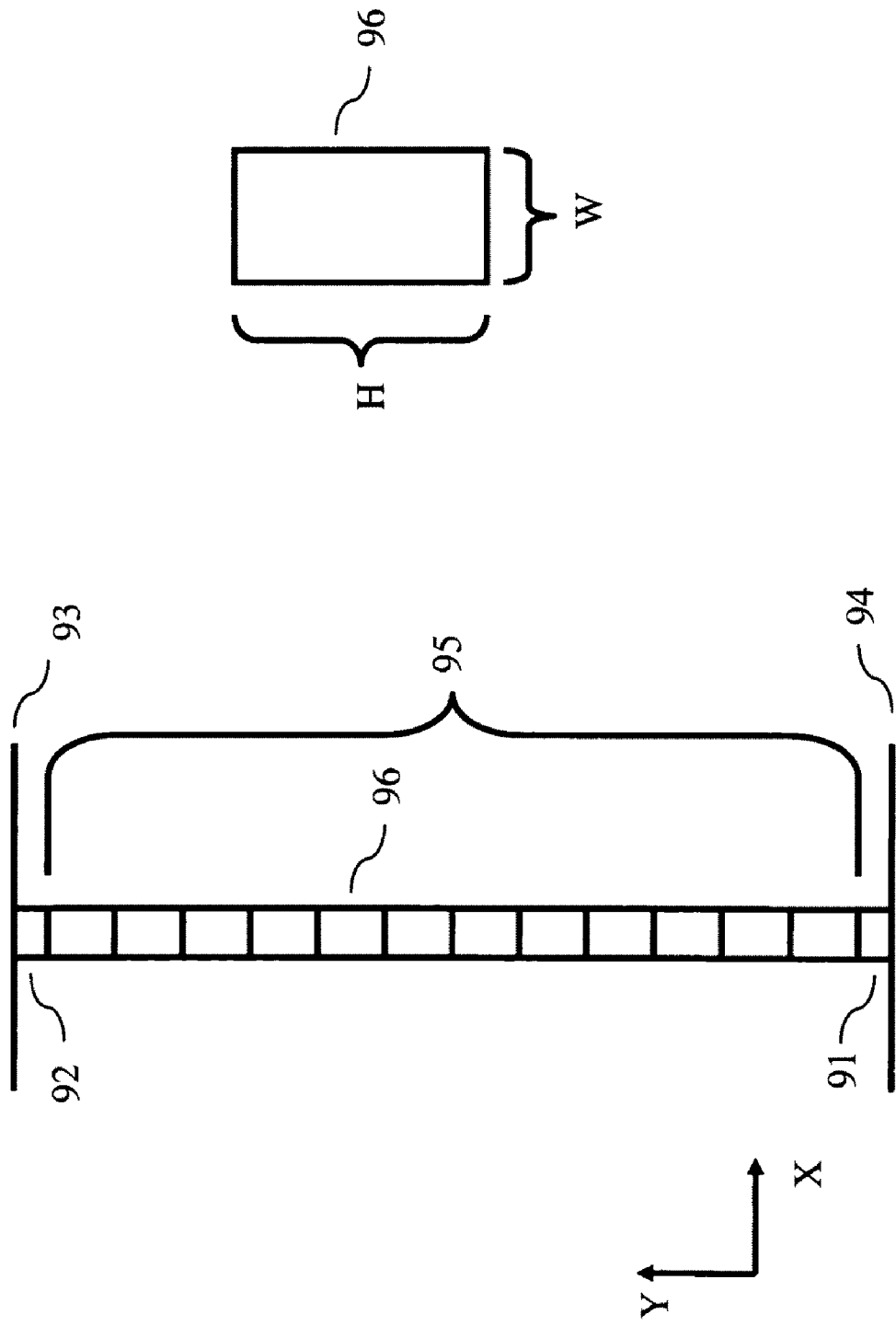
Figure 10:
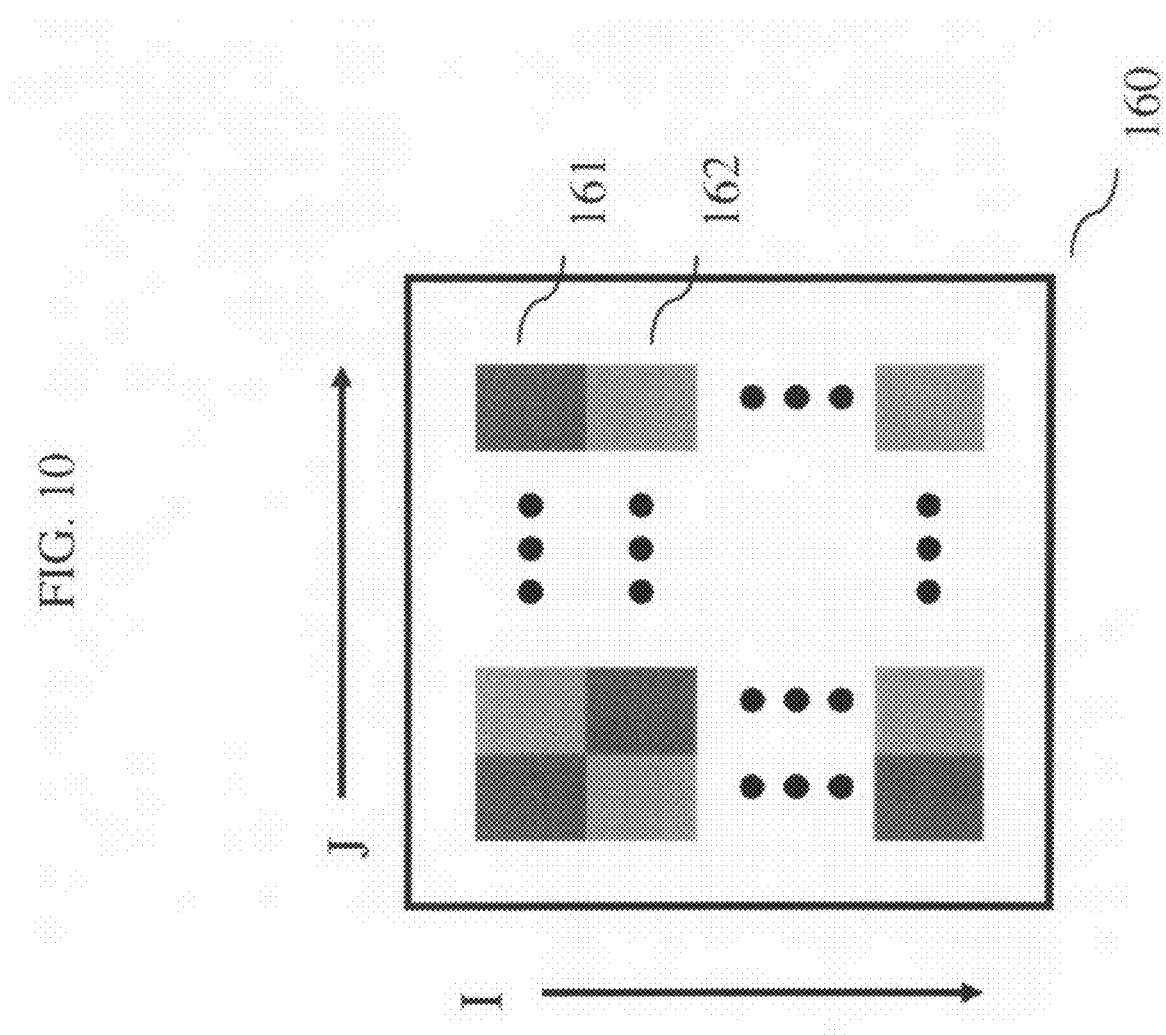
Figure 11:
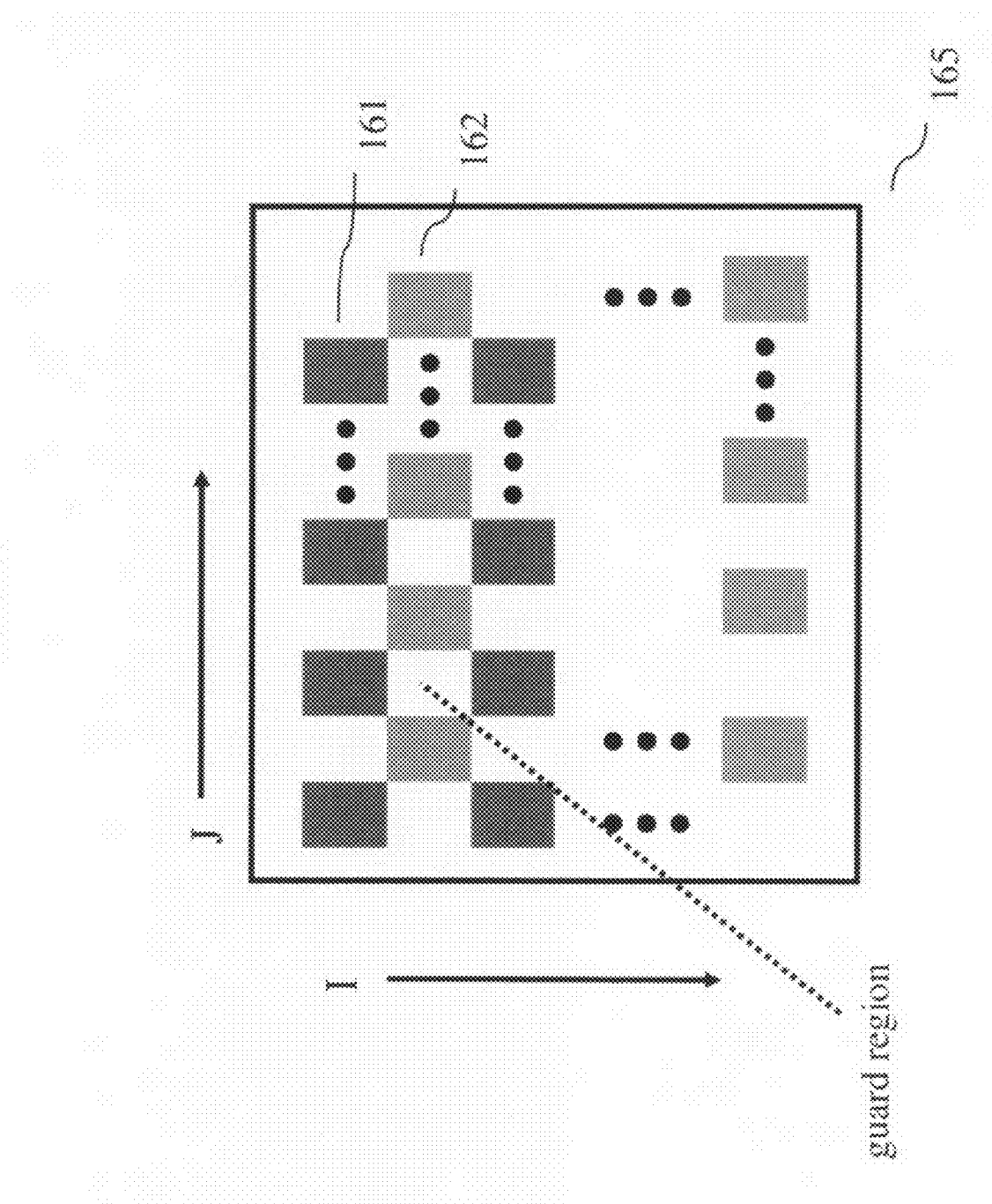

Turning now to FIG. 8, film portion 153 is again reproduced to additionally illustrate the inventive concept. Illustratively, each frame of a film is divided into a number of pixel regions, each pixel region conveying therein an optical symbol. These pixel regions can be arranged in any fashion. As used herein, the term "pixel region" used to convey a symbol is also referred to as a "write spot" or a "data dot." One arrangement is shown in FIG. 8 and is a simple rectangular array of pixel regions having rows, as illustrated by arrow 88, and columns, as illustrated by arrow 89. A column of pixel regions, 95, is further illustrated in FIG. 9. Each column extends between film boundaries 93 and 94. The latter represent the boundaries of the usable portions of the film, i.e., the available width of the film (the available width on a 35 mm print is 23 mm). Although not necessary to the inventive concept, guard regions may also exist between pixel regions, between rows and/or between columns, or any combination thereof. Guard regions may be used for synchronization purposes and/or spatial adjustment for accurately locating regions on the film. For example, guard regions may be arranged around each pixel region resulting in a checkerboard like pattern of used and non-used pixels. Guard regions may also include identifiable synchronization (sync) patterns to permit electronic or mechanical adjustment of the recording mechanism and reading mechanism (described below). It should be noted that guard regions reduce the amount of film used to store data and, therefore, affect the amount of available storage space. Illustratively, FIG. 9 shows the use of guard regions 91 and 92 (also referred to as gaps 91 and 92) between a respective film boundary and a column of data dots. Each column comprises a number of data dots or pixel regions. The column shown in FIG. 9 illustrates twelve pixel regions, each region conveying an 8 bit symbol as shown in FIGS. 6 and 7. Although not required for the inventive concept, each pixel regions is illustratively rectangular in shape having a height, H, and a width, W, as shown in FIG. 9 for pixel region 96. An illustrative arrangement of such a frame is shown in FIG. 10. Frame 160 comprises a rectangular array of optical symbols represented by symbols 161 and 162 comprising J columns and I rows, wherein each optical symbol represents a plurality of bits. It should be noted that the gray levels shown in symbols 161 and 162 are for illustration only in order to contrast the elements of the array. As noted above, other arrangements are possible, e.g., a checker-board pattern, where guard regions are disposed around each symbol are illustrated in frame 165 of FIG. 11. It should be noted that frames 160 and 165 shown in FIGS. 10 and 11 represent the usable area of the frame.

In terms of recording, the following should be noted. Currently, a maximum achievable resolving power is below 4000 resolvable elements in a frame. A 2K digitized image resolution is a theoretical maximum, since it needs more than 4000 resolvable elements (Nyquist Theorem), or 2000 line pairs in a frame. Thus, the MTF (modulation transfer function) resolving power requirement on a recorder is 2000/23 or 87 line pairs/mm. It should also be noted that 60 pairs per mm is the optimum today for a color film printing process. In addition, film grain also represents a constraint on recording density or line pairs per mm. Effects may be mitigated by shaping the signal before recording (e.g., predistortion), and performing complementary processing of the recovered signal. Grain noise is partially predictable and can be withdrawn by a suitable algorithm. In view of the above, black & white fine grain print stock can provide resolution beyond that of the color film printing process (for example, in excess of 100 line pairs per mm).

As noted above, pixel regions (write spots) can be of any shape and the shape of a write spot can be further optimized to improve recording density and therefore media utilization. Furthermore, the area between conventional film frames can be utilized to increase the total capacity of the film. If necessary, synchronization (sync) words can be inserted into the data to facilitate its subsequent reconstruction. Thus there appears no requirement to repetitively shutter the film exposure to constrain write spot placement within the boundaries of a projection film image.

Also, unlike telecine scanning of film where the complete 35 mm image area contains information, subsequent recovery of data requires that the data dots be scanned or sampled rather than any gaps between. To this end, it may be preferable that the data is formatted such that a continuous clock signal can be recovered independently of the data value. For example, data dots are written across the film frame area in a continuous manner without use of a film gate or shutter as the medium is transported in a smooth continuous manner. Each horizontal write scan will include header data to provide spatial identification of the image strip and to initiate clock recovery to enable reader track following.

It should be noted that recording optimization parameters may need to be adjusted to compensate for flare in a recorder. Recorder flare may occur due to on/off cycle time on adjacent spots (high contrast from white to dark adjacent spots, in addition to beam spread, causes blooming). Such impairments are in general directly related to the intensity of the illuminating spot hence an algorithm can be employed, if necessary, to organize data dot placement in accordance with spot intensity (data value) and the value of spatially adjacent spots. For example adjacent bright spots can be differentiated more accurately than adjacent spots of significantly different intensity. In this way the dot pitch will be dot brightness modulated or responsive to the data value. Alternatively, dots can be recorded in differing film layers in accordance with their data values, i.e., physically separate dim, medium and bright data dot values to reduce or eliminate inter-symbol interference. Likewise, there may be intrinsic stock flaws in film, e.g., "coating holidays" are density variance defects causing spot irregularities that may require use of, e.g., forward error correction (FEC) to correct recovery errors.

Figure 12:
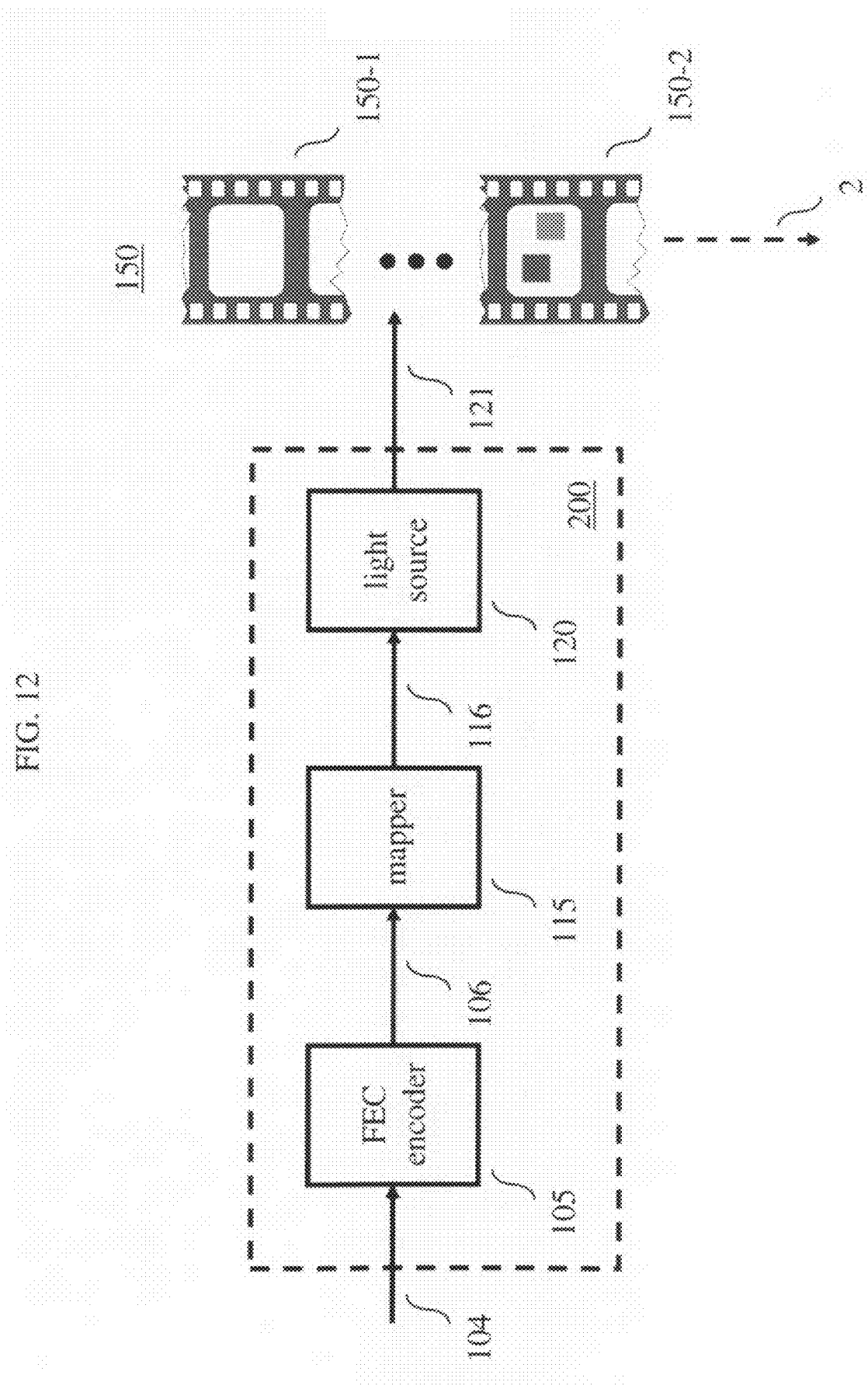
FIG. 12 shows another illustrative embodiment in accordance with the principles of the invention.

Reference should now be made to FIG. 12, which illustrates another embodiment of a recorder in accordance with the principles of the invention. Recorder 200 of FIG. 12 is similar to recorder 100 of FIG. 3 except that recorder 200 now includes forward error correction (FEC) as represented by FEC encoder 105. Any form of FEC encoding may be used, e.g., Reed Solomon coding, trellis coding, etc. The purpose of FEC encoding is to compensate for possible transmission channel impairments (here the transmission channel is represented by film 150). As can be observed from FIG. 12, FEC encoder 105 operates on input data signal 104 to provide an encoded data signal 106 to mapper 115, which maps the encoded data signal to optical symbols selected from an optical symbol constellation, as described above. Thus, a high data rate and low error rate may be achieved by a suitable choice of coding scheme.

Figure 13:
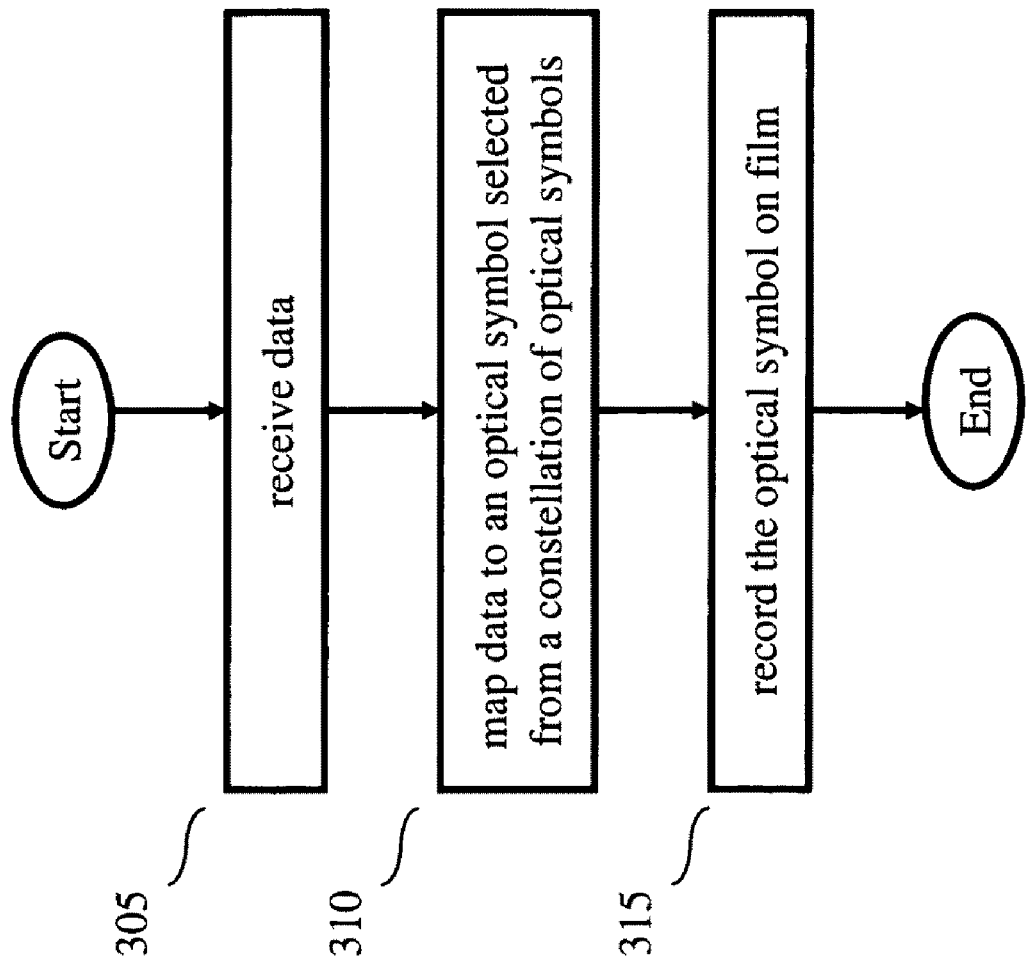
FIG. 13 shows an illustrative flow chart in accordance with the principles of the invention.
Figure 14:
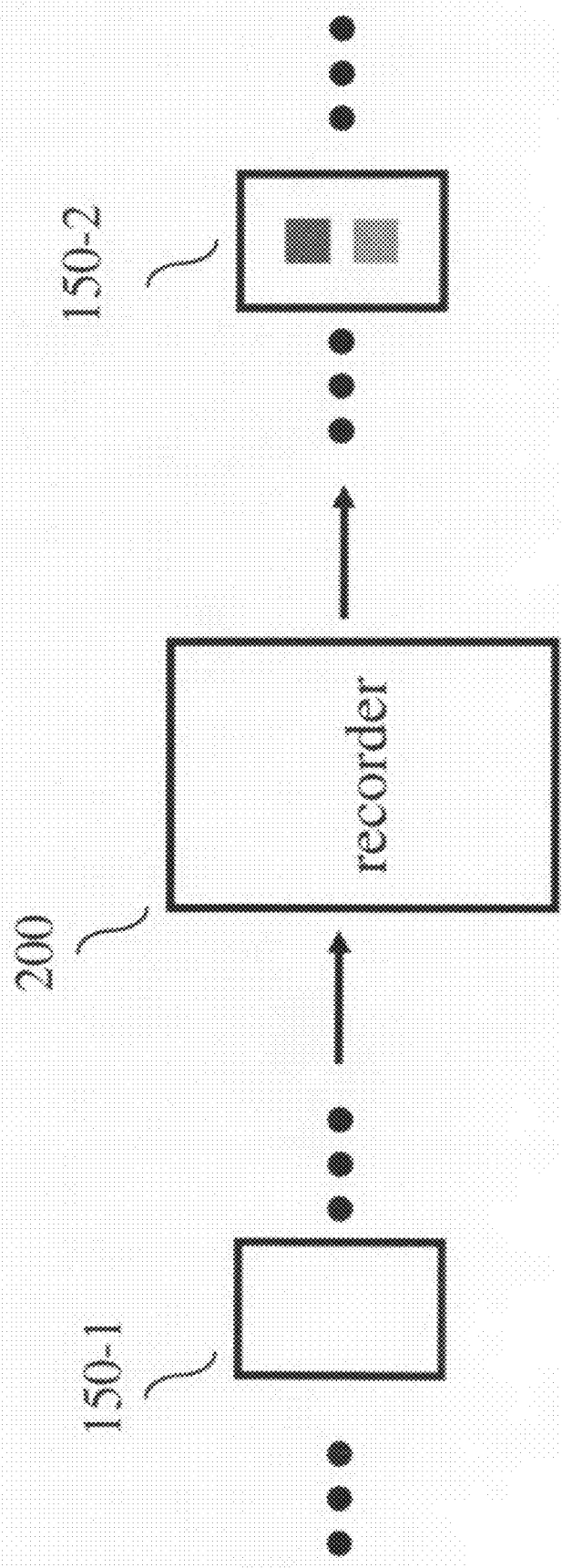
FIG. 14 shows another illustrative embodiment in accordance with the principles of the invention.

In view of the above, an illustrative flow chart in accordance with the principles of the invention for recording data on film is shown in FIG. 13. Reference should also be made to FIG. 14. In step 305, a recorder (e.g., recorder 100 of FIG. 3 or recorder 200 of FIG. 12) receives data for storage on a film (blank frame 150-1 of FIG. 14). In step 310, the recorder maps the received data to one of a number of optical symbols selected from a constellation of optical symbols. It should be noted that in the context of FIG. 12, step 310 includes the step of encoding the received data in accordance with an FEC code. In step 315, the recorder records the selected optical symbols on the film (illustrative recorded frame 150-2 of FIG. 14) to create a density film record.

Figure 15:
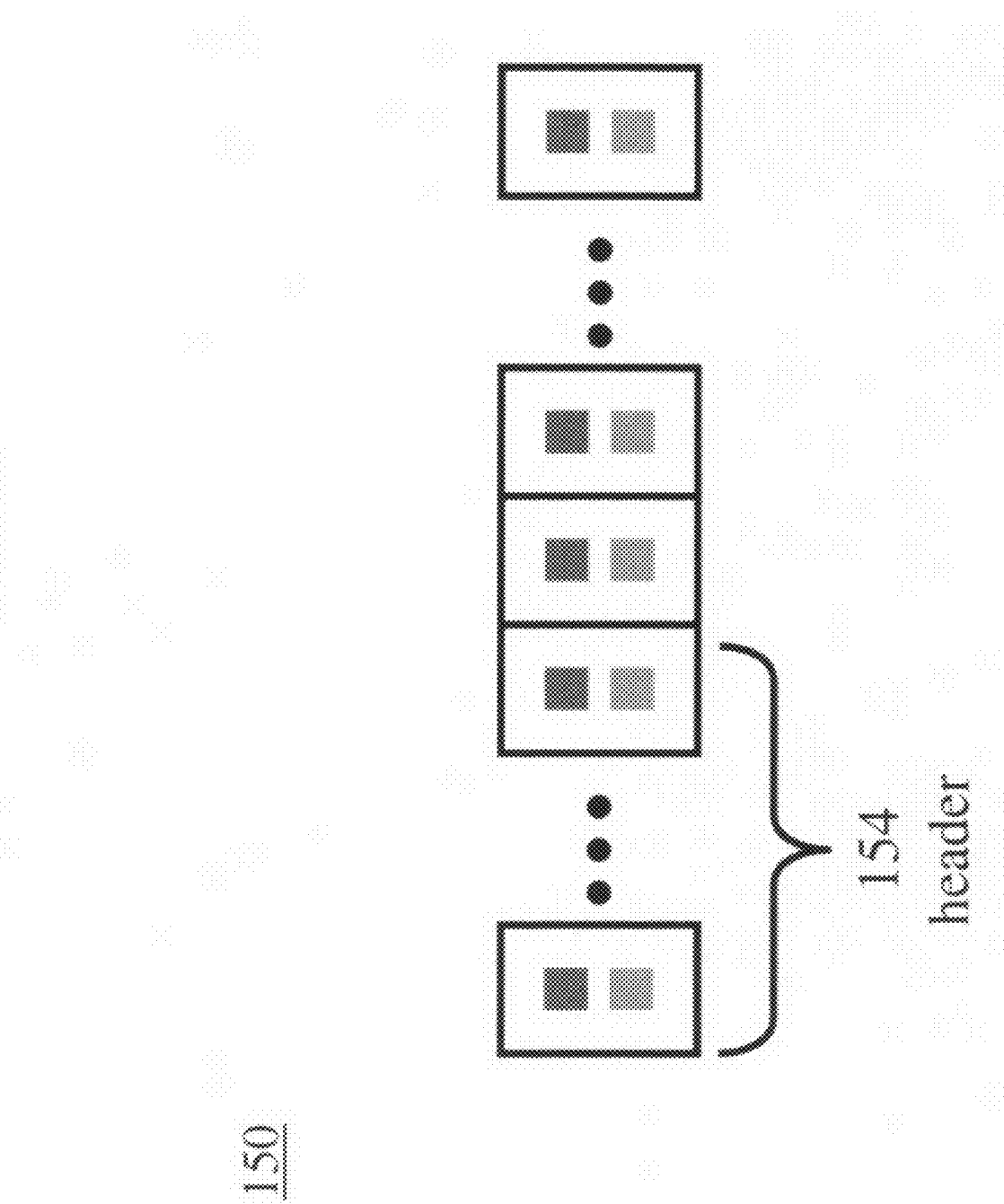
FIG. 15 shows another illustration of recording data on film in accordance with the principles of the invention.
Figure 16:
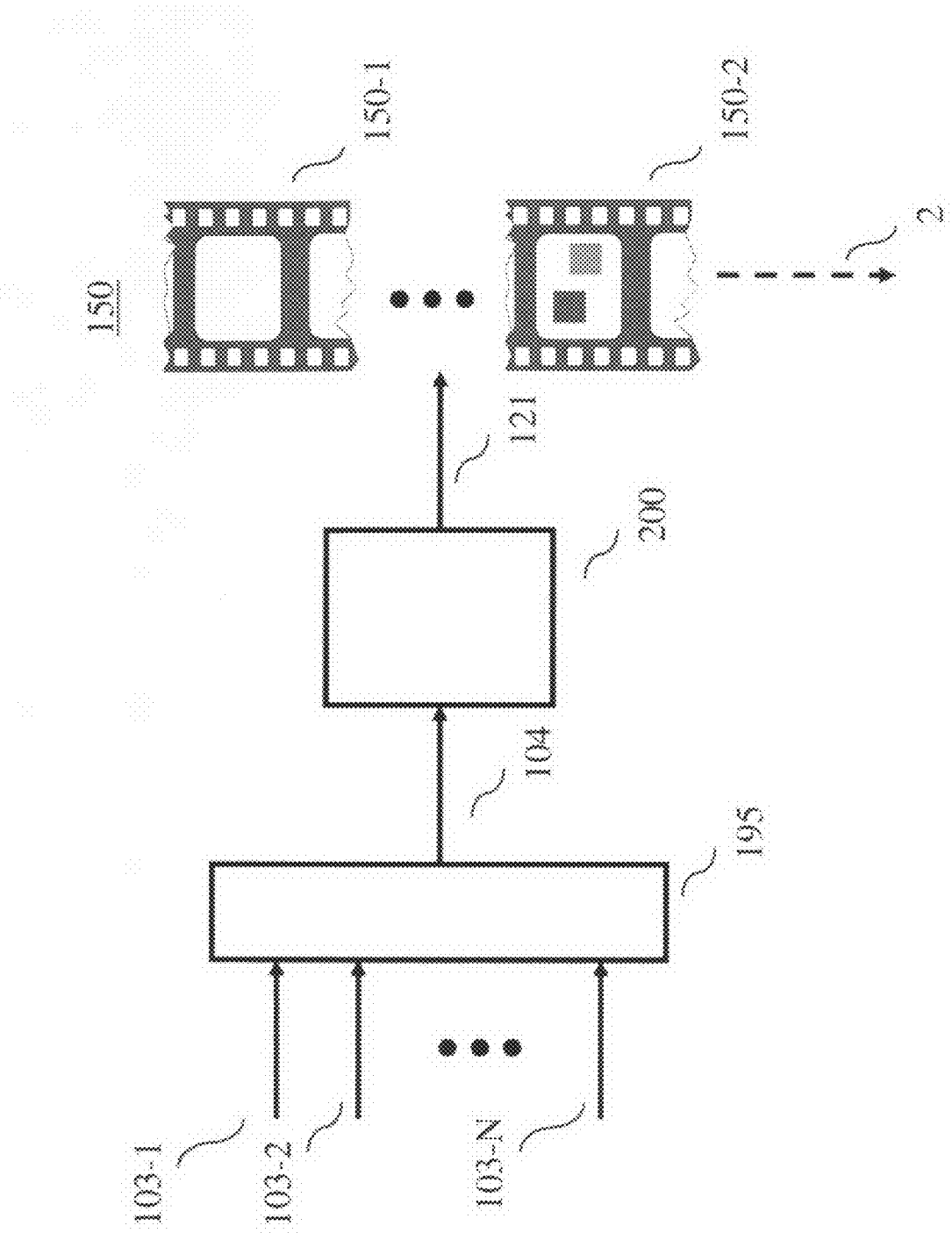
FIGS. 16-19 show other illustrative embodiments in accordance with the principles of the invention.

Since the inventive concept provides for the ability to store large amounts of data on film, the information represented by the data can include one, or more, different types. For example, content information (meta-data) pertaining to a digitized movie stored therein can be recorded on the film. Although not limited to the following examples, this meta-data might include items such as title, dates, source history, processing history prior to recording, etc. This meta-data can be stored anywhere in a film. One illustration of a film format is shown in FIG. 15, wherein the meta-data is stored as a header 154 on recorded film 150. The header comprises one or more frames of film 150 occurring at or substantially near the beginning of the film. Illustratively, the header, or leader, portion describes the encoding method in, e.g., English. In other words, the header information is recorded as an image such that it is readable by a person. This header information may include actual source code (e.g., in the "C" programming language) that is used to extract the data. Alternatively, each frame of film 150 can have predefined regions that, e.g., comprise content related information (such as meta-data), data (e.g., video), etc. In this regard, attention should now be directed to FIG. 16, which illustrates that a variety of different types of information may be stored on film 150. For example, a number of signals, N, representing different types of information are applied to combiner 195. The latter, e.g., time-division multiplexes the applied signals to form the above-described input data signal 104, which is applied to recorder 200 for storing the various types of information on film 150. For example, in the context of N=3, signal 103-1 represents the above-noted meta-data, signal 130-2 represents video information and signal 103-3 represents audio information. Other examples of types of information that can also be recorded on the film are information about coding scheme(s), instructions on recovery technique(s), etc. It should be noted that combiner 195 merely illustrates the ability to store different types of information on a film. As such, this function may also be performed within a recorder and may not require an actual combiner element.

Figure 17:
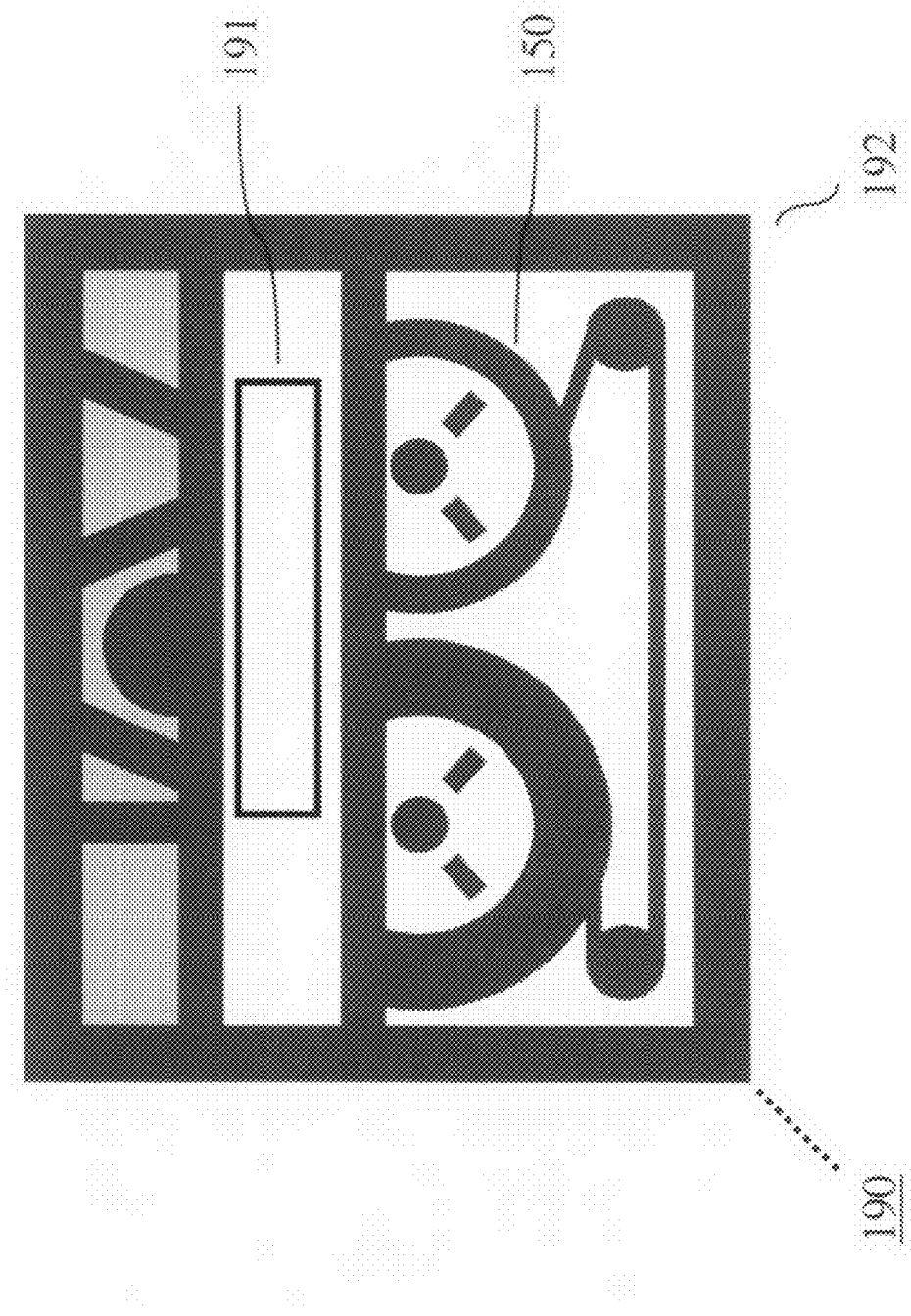

As described above, the inventive concept provides the ability to store large amounts of data using a proven archival medium—film. As such, for those applications involving long-term storage, it is preferable that the film, e.g., film 150 described above, be conveyed in a hermetically sealed "data cartridge" that can withstand the effects of long-term storage. Such a data cartridge 190 is illustrated in FIG. 17. The housing 192 of data cartridge 190 includes film 150, e.g., a monochromatic polyester-based film stock. Other than the inventive concept, data cartridge 190 is constructed as known in the art, e.g., data cartridge 190 is ruggedized and hermetically sealed to preserve film 150, reduce human handling and assist in minimizing decay over time. Data cartridge 190 can either be used to transport blank film such that the data cartridge itself is inserted into a recorder (e.g., recorder 100 or recorder 200, described above) for recording of data, or data cartridge 190 can be used to subsequently store recorded film therein. Data cartridge 190 may additionally contain content information (meta-data) pertaining to the data stored therein as represented by identifier 191. Although not limited to the following examples, this meta-data might include items such as title, dates, source history, processing history prior to recording, etc. Identifier 191 represents one or more of the following: a label of readable text, a bar code, a magnetic strip, a radio frequency identification (RFID) tag and/or a solid state memory chip (e.g., a memory chip that is capable of being programmed with identifying information). It should be noted that the above-described recording process may be further modified to automatically provide information to identifier 191. For example, in the context of readable text, identifier 191 may be printed by the recording device. Likewise in the context of a bar code. Or, in the context of a magnetic strip or solid state memory, identifier 191 may be automatically programmed with the meta-data. The use of machine-readable metadata would advantageously provide for the ability to utilize automated & mechanical handling, e.g., robotic shelving of a data cartridge.

Additional variations, and combinations of variations, to the above-described data cartridge 190 are possible. For example, in one variation data cartridge 190 is reusable in the context that the film stored within is replaceable. Similarly, in another variation, data cartridge 190 contains all the chemicals necessary for processing the film (e.g., reference to element 170 of FIG. 4). In other words, the film and chemicals are a part of a single assembly—thus, reducing the number of parts necessary to operate the system. In this context, used chemicals are preferably returned to a container (not shown) when processing is complete for recycling.

Figure 18:
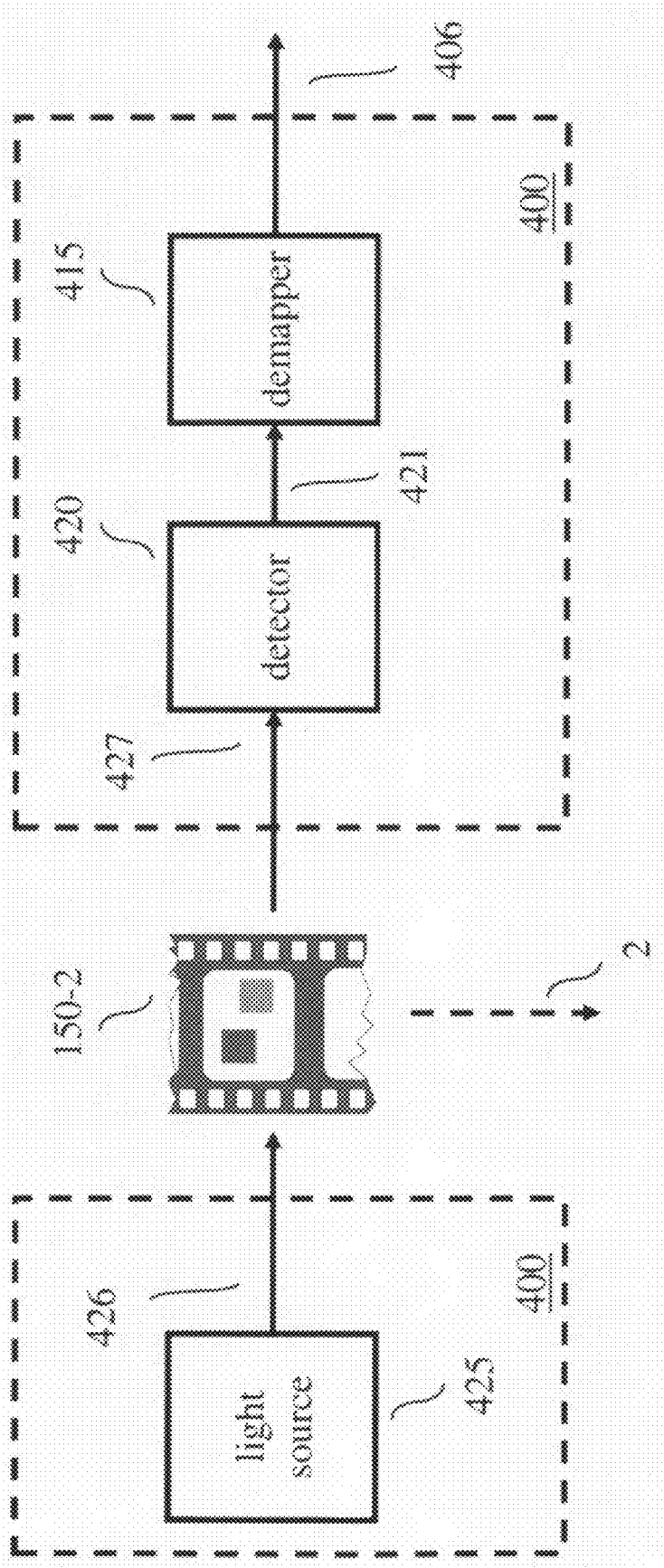

Referring now to FIG. 18, an illustrative apparatus 400 is shown in accordance with the principles of the invention for reading a film. Other than the inventive concept, reader 400 may be a conventional film scanner. Reader 400 comprises light source 425, detector 420 and demapper 415. This apparatus performs the complimentary function performed by recorder 100 of FIG. 3. A recorded film 150 (as represented by frame 150-2) moves through reader 400 a frame at a time. Each frame is illuminated by light source 425 via illumination signal 426. The resulting projected image 427 is applied to detector 420, which measures or assesses the corresponding OD level on at least one of the pixel regions of frame 150-2 and provides the corresponding value to demapper 415, via signal 421. Demapper 415 provides the associated bit value via signal 406. For example, in the context of the bit-to-symbol mapping shown in FIG. 2, a detected gray level 57 is converted by demapper 415 into a four bit value of "0101". As noted above, meta-data information may be recorded on film 150. Although not required, it is preferably that this meta-data is stored in a header of film 150 as illustrated in FIG. 15 so that the meta-data can be initially accessed upon reading of the film.

It should be noted that an element impacting the efficiency of a reader is the accuracy of reading the gray levels. Given that there may be variations in the exposure and processing mechanisms, the reading method preferably employs reading of areas that represent maximum and minimum recorded densities so as to calibrate the reading and determination of the intermediate gray levels. Extensions to this process may include measuring known intermediate values so that the reading device can calculate the transfer characteristic of the system and more accurately distinguish adjacent gray levels at all parts of the transfer characteristic.

Figure 19:
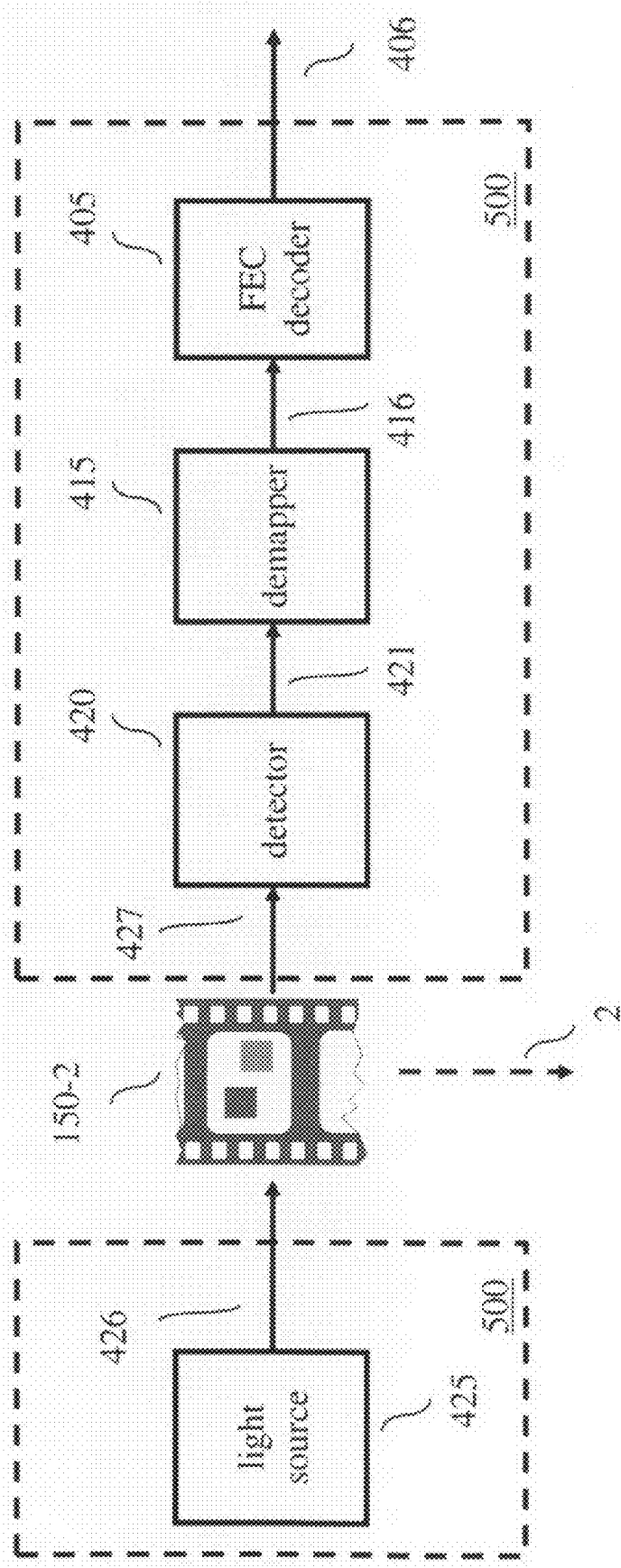

Turning now to FIG. 19, another illustrative apparatus 500 is shown in accordance with the principles of the invention for reading a film. Reader 500 is similar to reader 400 except for the addition of FEC decoder 405. As such, reader 500 performs the complimentary function performed by recorder 200 of FIG. 12. A recorded film 150 (as represented by frame 150-2) moves through reader 500 a frame at a time. Each frame is illuminated by light source 425 via illumination signal 426. The resulting projected image 427 is applied to detector 420, which measures or assesses the corresponding OD level on at least one of the pixel regions of frame 150-2 and provides the corresponding value to demapper 415, via signal 421. Demapper 415 provides the associated bit value via signal 416. For example, in the context of the bit-to-symbol mapping shown in FIG. 2, a detected gray level 57 is converted by demapper 415 into a four bit value of "0101". This bit value represents encoded data and is applied to FEC decoder 405, which recovers the data encoded therein and provides the recovered data via signal 406.

Figure 20:
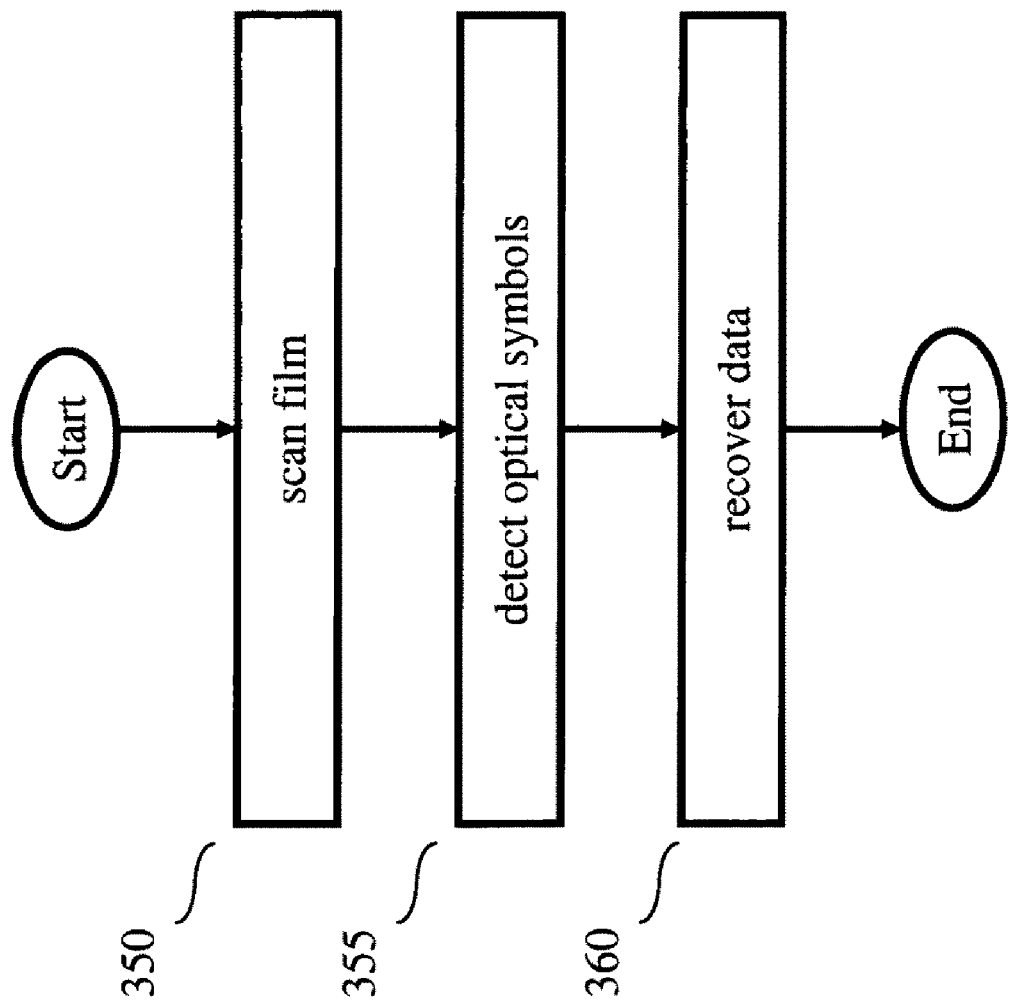
FIG. 20 shows another illustrative flow chart in accordance with the principles of the invention.

In view of the above, an illustrative flow chart in accordance with the principles of the invention for reading data on film is shown in FIG. 20. In step 350, a reader (e.g., reader 400 of FIG. 18 or reader 500 of FIG. 19) receives a film and scans each frame of the film. In step 355, the reader detects from the scanned image of each frame the optical symbols recorded on each frame of the film. In step 360, the reader recovers the data associated with each of the detected optical symbols. It should be noted that in the context of FIG. 19, step 360 includes the step of decoding the received data in accordance with an FEC code.

Figure 21:
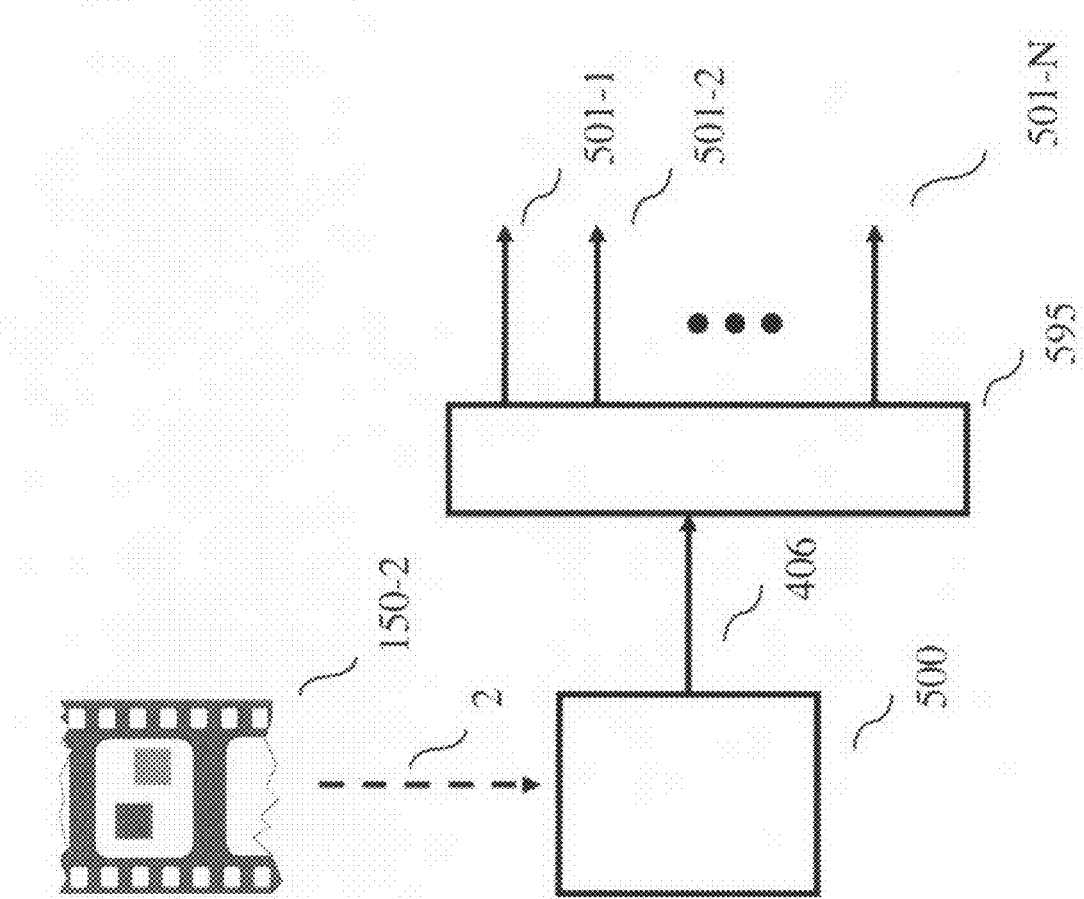
FIGS. 21-23 show other illustrative embodiments in accordance with the principles of the invention.

As noted above, a variety of different types of information may be stored on a film. In this regard, attention should now be directed to FIG. 21, which illustrates that a variety of different types of information may be recovered from a film. For example, a film 150 is applied to reader 500, which provides recovered data via signal 406, as described above. Signal 406 is applied to demultiplexer 595, which provides a number of different types of information as represented by signals 501-1, 501-2 through 501-N. For example, in the context of N=3, signal 501-1 represents the above-noted meta-data, signal 501-2 represents video information and signal 501-3 represents audio information. It should be noted that demultiplexer 595 merely illustrates the separation of the recovered data into different types of information. This function may also be performed within a reader and may not require an actual demultiplexer element.

Figure 22:
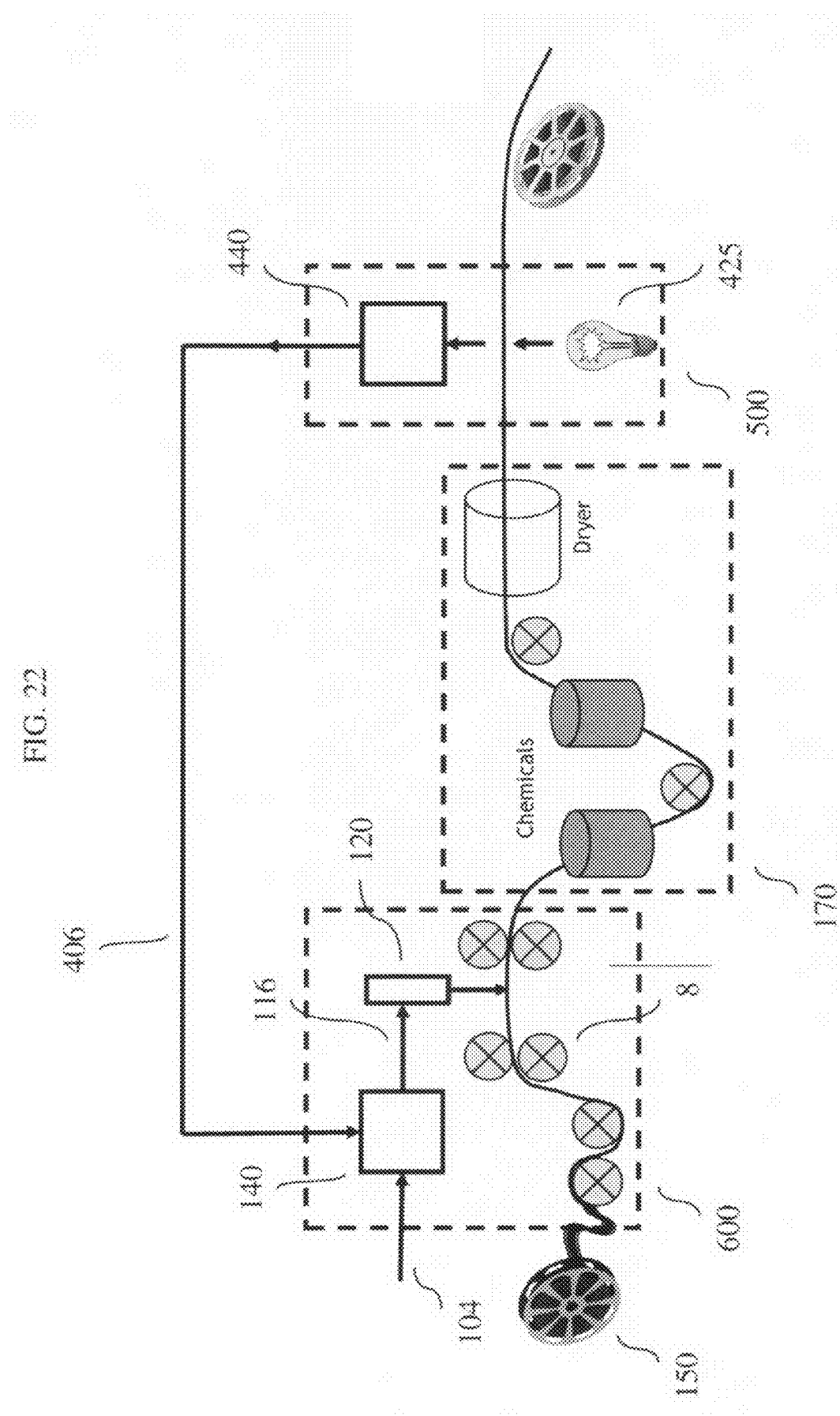
Figure 23:
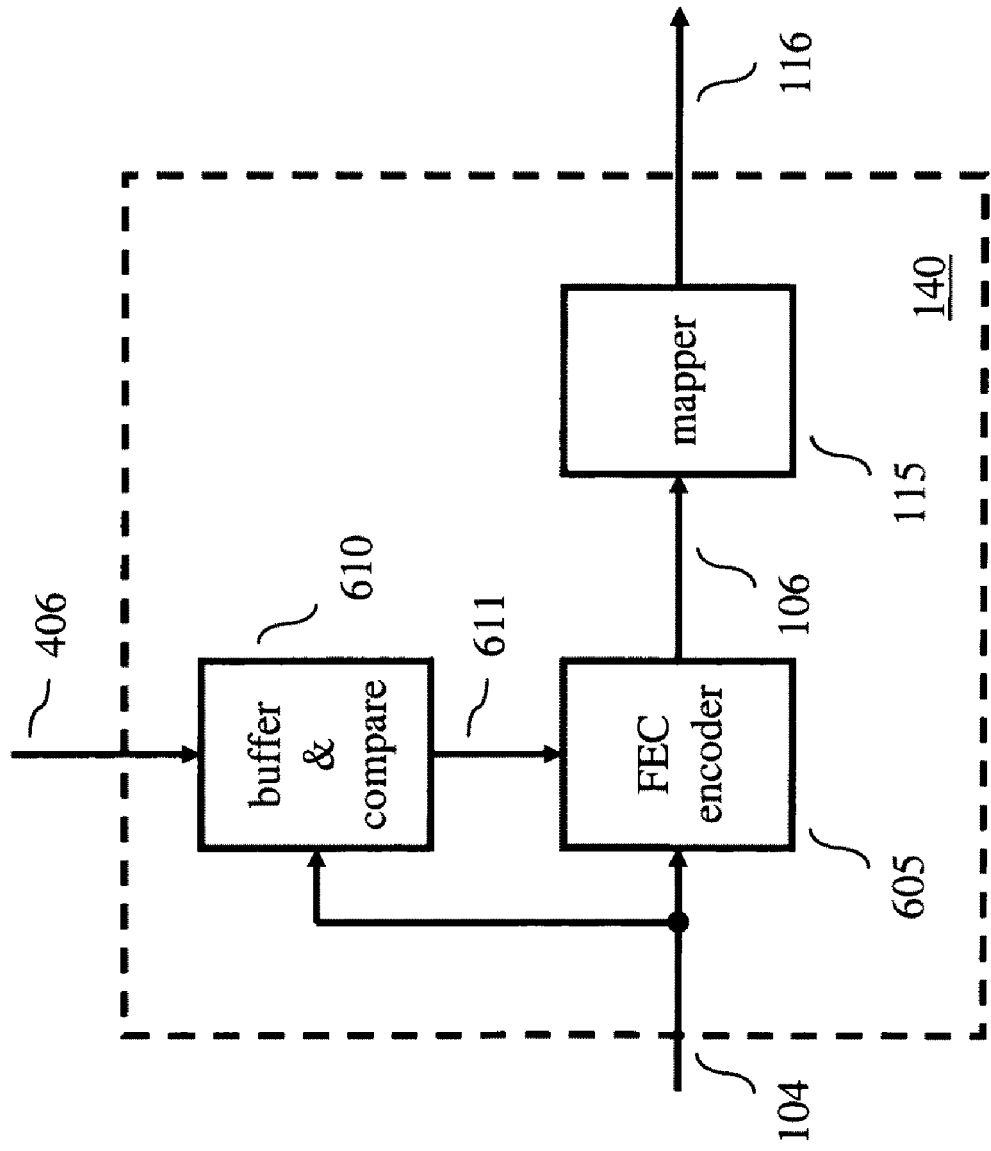

Reference should now be made to FIG. 22, which illustrates another embodiment in accordance with the principles of the invention. The apparatus shown in FIG. 22 illustrates a recording process that includes data verification. The apparatus of FIG. 22 includes recorder 600, element 170 and reader 500. A film 150 is applied to recorder 600 for recording data thereon. For the purposes of this example, recorder 600 is similar to recorder 200 of FIG. 12 and stores encoded data on film 150. The latter is further processed by element 170, which includes chemical processing and drying as known in the art for making the record permanent. The recorded film is then applied to reader 500, which provides signal 406 that represents the data recovered from film 150. As noted above, the recording process includes data verification. The data verification is accomplished via the feedback of signal 406 to element 140 of recorder 600. FIG. 23 shows an illustrative embodiment of element 140, which comprises FEC encoder 605, mapper 115 and buffer & compare element 610. The input data signal 104 is applied to both FEC encoder 605 for encoding and buffer & compare element 610. The latter temporarily stores a copy of the original data being recorded on film 150, e.g., for a particular frame. Mapper 115 performs as described earlier and selects one of a number of optical symbols, from a constellation of symbols, as a function of a plurality of data bits applied thereto via signal 106. The selected optical symbols are provided via signal 116. Turning now to the verification process, signal 406 represents the recovered data, e.g., for the particular frame, and is also applied to buffer & compare element 610. As such, buffer & compare element 610 includes enough storage capacity to buffer the original data (and original data from following frames) over the time period required for recording a particular frame, processing that particular frame (via element 170) and recovering the data from that particular frame (via reader 500). Buffer & compare element 610 compares the original data for the particular frame to the recovered data for that particular frame. If an error is detected, i.e., original data has been detected as being "lost", the lost data is applied to FEC encoder 605, via signal 611, for re-recording at a subsequent point on the film. This results in the recorded data becoming fragmented on the film. To enable a reader to subsequently recover the data from a recorded film in the correct order, a look-up table (not shown) is written on a predefined portion of the film. This look-up table maps various portions of the original data to, e.g., frames of film 150, to track any fragmentation such that a reader can correctly re-assemble the data upon recovery of the look-up table.

Although the inventive concept was described in the context of a monochrome film, the inventive concept is not so limited. For example, the system described may be extended to record a plurality of records on a multilayer film, such as visible/infrared film, or conventional three layer color film. The additional data records may be used to support a multi-axis coding scheme with an N-dimensional constellation where "N" is the number of separate records. In this case, N layers, each using $2^M$ gray levels would provide (M)(N) bits. It should be noted that there may be limitations on reading pixels directly behind a dense pixel, but staggering of the records or placement coding rules could improve pixel separation on each layer while still providing useful multiplication of the overall storage density. Indeed, multiple frequency ranges or infrared (IR) layers can significantly improve efficiency or packing density.

Thus, various combinations of pixel size and number of density levels are possible in accordance with the principles of the invention. Different film stocks, processing technique, recording and reading apparatus, may all affect the best choice(s) of pixel size and number of density levels.

As described above, the inventive concept can be applied to any area such as, but not limited to, entertainment (media content, e.g., movies, audio, etc.), medical imaging, satellite/geographical imaging; security, historical archives, long-term record keeping, consumer private archiving, etc.

Further, the preferred embodiment has been described in terms of 35 mm movie film, segmented into frames, possibly with intermittent motion and possibly with shuttering. This is convenient in that it permits the use of the most commonly available film stocks, and a wide range of equipments designed for use with such film stocks. However, the inventive concept is not so limited and may be applied to other types of film stocks, including film sheets, to apparatus that does not segment the film into frames, but that may use alternative segmentation or no segmentation, and to apparatus that moves the film in a continuous manner rather than with intermittent motion. Other examples of film in accordance with the principles of the invention are a piece of film similar in form to a paper sheet (e.g., a letter-size or 5"×7" picture size).

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although shown as separate elements in FIG. 12, the encoder and mapper of FIG. 12 can be a part of the same element. It is therefore to be understood that numerous modifications may be made to the illustrative embodiments and that other arrangements may be devised without departing from the spirit and scope of the present invention as defined by the appended claims.

The invention claimed is:

1. An apparatus comprising:
    a mapper for selecting one of a number of optical density levels as a function of data applied to the mapper, wherein each optical density level represents a symbol from a constellation of symbols, and wherein each symbol represents a plurality of bits of data; and
    a light source for exposing a film such that the selected optical density level is recorded on the film.

2. The apparatus of claim 1, wherein each optical density level is associated with a different level of gray.

3. The apparatus of claim 1, wherein the light source exposes frames of the film such that at least one frame records the selected optical density level.

4. The apparatus of claim 1, wherein at least some of the data represents at least a portion of a movie.

5. A method for storing data, the method comprising:
    receiving data;
    mapping the data to a symbol selected from a constellation of symbols and wherein each symbol represents a plurality of bits of data, and wherein each symbol is associated with a respective optical density level; and
    recording the symbol on film by creating thereon the respective optical density level.

6. The method of claim 5, wherein the film is monochrome film.

7. The method of claim 5, wherein the symbol represents an optical density level.

8. The method of claim 5, wherein the optical density level represents a level of gray.

9. The method of claim 5, wherein the recording step includes the step of recording the symbol on at least one frame of the film.

10. The method of claim 5, wherein the recording step includes the step of exposing a pixel region of the at least one frame for recording of the symbol.

11. The method of claim 5, wherein at least some of the data represents at least a portion of a movie.

12. An apparatus comprising:
    a mapper for selecting one of a number of optical density levels as a function of data applied to the mapper, wherein each optical density level represents a symbol from a constellation of symbols, and wherein each symbol represents a plurality of bits of data; and
    a light source for exposing a film such that the selected optical density level is recorded on the film;
    wherein the light source exposes frames of the film such that selected optical density levels are recorded in a checker-board like pattern on at least one frame of the film.

13. An apparatus comprising:
    a mapper for selecting one of a number of optical density levels as a function of data applied to the mapper, wherein each optical density level represents a symbol from a constellation of symbols, and wherein each symbol represents a plurality of bits of data; and
    a light source for exposing a film such that the selected optical density level is recorded on the film;
    wherein the light source exposes frames of the film such that selected optical density levels are recorded in a rectangular like pattern on at least one frame of the film.

14. An apparatus comprising:
    a mapper for selecting one of a number of optical density levels as a function of data applied to the mapper, wherein each optical density level represents a symbol from a constellation of symbols, and wherein each symbol represents a plurality of bits of data;
    a light source for exposing a film such that the selected optical density level is recorded on the film; and
    further comprising an encoder for encoding the data with an error correction code before selection of an optical density level.

* * * * *